(12) United States Patent
Senn et al.

(10) Patent No.: US 9,568,298 B2
(45) Date of Patent: Feb. 14, 2017

(54) MACHINE TOOL AND METHOD FOR MEASURING A WORKPIECE

(71) Applicant: FRITZ STUDER AG, Steffisburg (CH)

(72) Inventors: Andreas Senn, Lyss (CH); Walter Fabris, Uetendorf (CH); Reto Zwahlen, Steffisburg (CH); Fred Gaegauf, Hagendorn (CH)

(73) Assignee: FRITZ STUDER AG, Steffisburg (CH)

( * ) Notice: Subject to any disclaimer, the term of this patent is extended or adjusted under 35 U.S.C. 154(b) by 38 days.

(21) Appl. No.: 14/704,239

(22) Filed: May 5, 2015

(65) Prior Publication Data
US 2015/0233693 A1 Aug. 20, 2015

Related U.S. Application Data

(63) Continuation of application No. PCT/EP2013/073111, filed on Nov. 6, 2013.

(30) Foreign Application Priority Data

Nov. 7, 2012 (DE) .................. 10 2012 110 673

(51) Int. Cl.
*G01B 5/08* (2006.01)
*B24B 49/04* (2006.01)
(Continued)

(52) U.S. Cl.
CPC .............. *G01B 5/08* (2013.01); *B23Q 17/20* (2013.01); *B24B 5/02* (2013.01); *B24B 49/04* (2013.01); *B24B 49/045* (2013.01); *G01B 5/201* (2013.01)

(58) Field of Classification Search
CPC ....... B23Q 17/20; B23Q 17/2233; B24B 5/04; B24B 5/42; B24B 49/03; B24B 49/045; B24B 49/10; B24B 51/00; G01B 3/30; G01B 21/12
See application file for complete search history.

(56) References Cited

U.S. PATENT DOCUMENTS 4,606,130 A * 8/1986 Vetter .................. G01B 5/0002
33/501.03
4,637,144 A * 1/1987 Schemel ............... B23Q 17/20
33/501.03
(Continued)

FOREIGN PATENT DOCUMENTS

DE 4412682 10/1995
DE 19616353 10/1997
(Continued)

OTHER PUBLICATIONS

International Search Report (Including Translation) for corresponding International Application No. PCT/EP2013/073111, mailed Feb. 12, 2014).
(Continued)

*Primary Examiner* — Timothy V Eley
(74) *Attorney, Agent, or Firm* — Jason H. Vick; Sheridan Ross, PC

(57) ABSTRACT

The present disclosure relates to a machine tool, such as a grinding machine, and to a method for measuring a workpiece in a machine tool. The machine tool may comprise a workpiece mount (14), a tool unit (28), a measuring device (48) and a control device (56) that is connectable to the measuring device (48) and the tool unit (28), wherein the measuring device (48) is received at the tool unit (28) and comprises at least one toggle measurement head (66; 68), wherein the at least one toggle measurement head (66; 68) is received at a support piece (80) that provides a plurality of defined predetermined locations for the at least one toggle measurement head (66; 68), and wherein the control device (56) is arranged to detect signals that are triggered by the at (Continued)

least one toggle measurement head (66; 68) when touching a workpiece (96), and to determine on the basis of an actual location of the tool unit (28) an actual position of the at least one toggle measurement head (66; 68).

20 Claims, 12 Drawing Sheets

(51) Int. Cl.
*B24B 5/02* (2006.01)
*B23Q 17/20* (2006.01)
*G01B 5/20* (2006.01)

(56) References Cited

U.S. PATENT DOCUMENTS

| | | | | |
|---|---|---|---|---|
| 5,251,405 A | * | 10/1993 | Clauss | B24B 19/125 451/25 |
| 5,761,821 A | * | 6/1998 | Laycock | B23Q 17/20 33/501.05 |
| 6,159,074 A | * | 12/2000 | Kube | B24B 5/00 33/549 |
| 7,690,967 B2 | * | 4/2010 | Makiuchi | B24B 5/04 451/11 |
| 2004/0215414 A1 | | 10/2004 | Kaisser | |
| 2011/0119943 A1 | | 5/2011 | Arnold | |
| 2014/0213148 A1 | | 7/2014 | Gaegauf | |
| 2015/0285609 A1 | * | 10/2015 | Ito | G01B 5/016 33/503 |

FOREIGN PATENT DOCUMENTS

| | | |
|---|---|---|
| DE | 102009042252 | 4/2011 |
| DE | 102011115254 | 3/2013 |
| WO | WO 01/98847 | 12/2001 |
| WO | WO 2013/045484 | 4/2013 |

OTHER PUBLICATIONS

Written Opinion for corresponding International Application No. PCT/EP2013/073111, mailed Feb. 12, 2014).

International Preliminary Report on Patentability (Including Translation) for corresponding International Application No. PCT/EP2013/073111, mailed May 12, 2015.

* cited by examiner

MACHINE TOOL AND METHOD FOR MEASURING A WORKPIECE

CROSS-REFERENCES TO RELATED APPLICATIONS

This application is a continuation of International Patent Application PCT/EP2013/073111, filed on Nov. 6, 2013 designating the U.S., which International Patent Application has been published in German language and claims priority from German patent application 10 2012 110 673.8, filed on Nov. 7, 2012. The entire content of these priority applications are fully incorporated by reference herewith.

BACKGROUND

The present disclosure relates to a machine tool, particularly a grinding machine, comprising a workpiece mount, a tool unit, a measuring device and a control device which is connectable to the measuring device and the tool unit. The present disclosure further relates to a method for measuring a workpiece in a machine tool, particularly a grinding machine. The present disclosure further relates to a computer readable non-transitory storage medium.

Machine tools, particularly grinding machines, are known in the art. By way of example, cylindrical grinding machines may comprise rotationally symmetric tools, particularly grinding wheels, which may cooperate in a suitable fashion with a workpiece for material removal. By way of example, cylindrical grinding machines may be arranged for external cylindrical grinding, internal cylindrical grinding or for infeed grinding and angular infeed grinding, respectively. Besides grinding wheels generally also abrasive belts may be utilized for cylindrical grinding. Besides rotationally symmetric surfaces, also eccentrically shaped workpiece surfaces may be machined when the workpiece mount and the tool unit are appropriately drivable and movable with respect to each other. In this way, for instance, camshafts, crankshafts or similar workpieces comprising eccentric geometries may be machined and/or grinded.

A to-be-machined workpiece may be received between two centers of a workpiece mount, for instance, or may be one-sidedly received at a workpiece mount. Besides, so-called centerless grinding is known which involves that the workpiece is not received between centers of the grinding machine, but rather received and guided via receiving bars, regulating wheels, guiding rollers and the like for instance.

A grinding machine is known from DE 10 2009 042 252 A1 which grinding machine comprises a measurement apparatus that is arranged for in-process measuring test pieces in the course of a machining process. To this end, the measurement apparatus comprises a measurement head which is pivotably connected with a base body of the measurement apparatus via a linkage. The measurement head comprises a deflectable measuring probe which is coupled to a measuring prism, and which is provided for determining the diameter or the roundness of the test piece. The linkage shall be arranged to track movements of the test piece, at least in a defined region, for instance a rotation of a crank pin of a crankshaft about the rotation axis of the crankshaft.

In this way, also with grinding machining processes of eccentrically arranged cylinder surfaces basically an in-process measurement may be effected, at least sectionally. This may take place simultaneously to the grinding machining. However, the measurement apparatus comprises a complex structure. The linkage is arranged in a complex fashion and needs to be controlled in an elaborate fashion when in operation.

The so-called in-process measurement, i.e. a measurement in the course of a machining operation, may enable high precision machining operations, and may contribute to an increased manufacturing quality and process reliability. To this end, it is however regularly required to provide a measurement head which is accurately adapted to the expected measure for each to-be-measured workpiece dimension, i.e. for each diameter, for instance. This may involve a single purpose measurement head, or a measurement head at which for instance two measuring probes are received in an adjustable fashion and that comprise a distance to one another which corresponds to the expected distance. The measuring probes have to be adjusted in a high precision fashion and respectively oriented with respect to the respected to-be-inspected measure.

Such an in-process measurement head is shown for instance in DE 196 16 353 A1. In this respect, effortful setting, adjusting and/or calibrating processes which may be required to adapt the measurement head to the respective intended purpose may be disadvantageous. Particularly, with single-piece machining, small batch series and medium batch series, for instance setting the measurement head may cause a time consumption which is not negligible.

In this context, it is worth mentioning that the measurement apparatus which is known from DE 10 2009 042 252 A1, in some circumstances, may not correspond to the measurement accuracy which is necessary for in-process measurements. The associated measurement head comprises a measuring probe and a measuring prism which are coupled via a plurality of linkage elements of the linkage with an absolute measurement reference. Any deviations of single elements of the kinematic chain of the linkage may be reflected in the location of the of the measurement head with respect to the test piece. This may be particularly disadvantageous when measuring eccentrically shaped workpieces in a section-by-section fashion. The location of the measurement head with respect to the test piece, for instance with respect to its angular position, may be error prone.

In view of this, it is an object of the present disclosure to provide a machine tool, particularly a grinding machine, which enables a high-precision measuring of workpieces with little efforts, particularly for measuring workpiece diameters.

It is a further object to provide a machine tool, particularly a grinding machine, which enables a highly flexible measuring of workpieces with little efforts.

It is a further object to provide a corresponding method for measuring a workpiece, particularly for measuring workpiece diameters.

It is still a further object to provide a corresponding machine tool control program disposed on a computer readable non-transitory storage medium.

SUMMARY

In accordance with one aspect of the present disclosure, these and other objects are achieved by a machine tool, particularly a grinding machine, comprising the following:
  a workpiece mount comprising at least one workpiece holder for receiving a workpiece,
  a tool unit comprising a tool spindle, particularly comprising a grinding head, for receiving and for driving a tool, in particular at least one grinding wheel, wherein the tool unit is movable along at least one feed axis with respect to the workpiece, a modular measuring device which is received at the tool unit, wherein the measuring device comprises at least one toggle measurement head, wherein the at least one toggle measurement head is arranged at a support piece that provides a plurality of defined predetermined locations for the at least one toggle measurement head, and a control device which is connectable to the measuring device and the tool unit, wherein the control device is configured for detecting signals that are triggered by the at least one toggle measurement head when touching the workpiece, and for determining, on the basis of an actual location of the tool unit, an actual position of the at least one toggle measurement head.

In accordance with the above aspect a considerably enlarged functionality may be provided, and namely with little additional efforts. The control device may recourse to positional data which may be anyway detected and/or detected without substantial additional efforts when moving the tool unit, the actual position of the at least one toggle measurement head may be defined in a high precision fashion. By way of example, on the basis of a trigger time instant of the at least one toggle measurement head and the associated actual location of the tool unit, the actual position of the toggle measurement head may be determined. This may allow conclusions as to workpiece geometries and/or workpiece dimensions.

The support piece provides for a plurality of predetermined locations for the at least one toggle measurement head. In this way, the at least one toggle measurement head may be fixed at different positions. This may contribute to a fulfillment of different measurement tasks. The measurement tasks may for instance involve radially touching the workpiece. Further, the measurement tasks may involve axially touching the workpiece. The at least one toggle measurement head may be received at the support piece in such a way that for instance a probe arm may be inserted in a depression or recess at the workpiece. This may be performed basically axially or radially. The depression or recess may be arranged as a bore or a groove. A bore may be arranged as an axial bore or a radial bore, for instance. A groove may be arranged as longitudinal groove or circumferential groove. Different defined locations and orientations of the at least one toggle measurement head allow for a precise determination of a variety of dimensions.

A plurality of defined predetermined locations for the at least one toggle measurement head may further enable touching and measuring workpieces which comprise significant differences in terms of their dimensional ranges and magnitudes. In this way, for instance, both relatively "large" and relatively "small" workpieces may be measured without substantial changeover work. Also the detection of different positional and form tolerances may be envisaged. In an exemplary embodiment, two toggle measurement heads are arranged at the support piece. In this way, the workpiece may be measured with even higher flexibility. In accordance with an exemplary embodiment, the at least one toggle measurement head is arranged as an actuation switch (or: trigger switch). In other words, the at least one toggle measurement head may be configured for generating only two condition signals, for instance. This may involve the condition "no contact" and the condition "contact". In this way, by means of a "contact" signal which is generated by the at least one toggle measurement head, a mediate determination of the position of the toggle measurement head may be accomplished under consideration of the actual location of the tool unit. Information, for instance a workpiece geometry, may be obtained. The actual position of the at least one toggle measurement head may be basically detected in an absolute or relative manner.

Particularly, when the tool unit comprises more than one movable axis to be displaced, the actual position of the at least one toggle measurement head may be detected in a plurality of directions or spatial axes. The tool unit is movable along at least one feed axis with respect to the workpiece. As used herein, the feed axis may be referred to as infeed axis. Accordingly, the (absolute or relative) actual position of the at least one toggle measurement head at this axis may be detect. When the tool unit is in addition moveable along at least a further axis relative to the workpiece, the detection of the actual position may be effected on the basis of a corresponding plurality of spatial axes. Such a movement may for instance comprise an advancing movement. For instance, a two dimensional or three dimensional determination of the position of the at least one toggle measurement head may be accomplished. It goes without saying that the tool unit may be displaced in a direct or indirect fashion. Generally, a relative motion between the tool unit and the workpiece may be involved. In other words, for instance also a movement of the workpiece with respect to the tool unit may be regarded as a relative motion between the tool unit and the workpiece. Also with this movement, detectable actual locations of the tool unit may be utilized for the determination of the actual position of the at least one toggle measurement head. Further, the tool unit may also be displaced in a mediate fashion. This may be effected for instance via a cross-table which enables a motion in two spatial directions.

It may be generally envisaged, on the basis of reference objects, to perform a relative or an absolute calibration of the modular measuring device. The calibration may particularly relate to the at least one toggle measurement head. Reference objects may be provided at the machine tool as fixed or releasable reference geometries. By touching a reference object with a known location and/or a known geometry, the calibration may be effected. An absolute calibration may involve a precise determination of the actual position of the at least one toggle measurement head in relation to the actual location of the tool unit. In this way distinct spots may be detected in an absolute fashion, for instance. A relative calibration may involve touching two defined spots at a reference object, for instance. For instance, when a distance between those spots is known beforehand, a relative calibration may be effected without the need to detect the respective absolute locations of the at least one toggle measurement head.

In an exemplary embodiment, the modular measuring device comprises at least two toggle measurement heads that are received at the support piece in a manner spaced to one another, wherein the at least two toggle measurement heads comprise, in a first measurement configuration, a basic distance to one another that defines a measurement region, wherein the basic distance is selected to be larger than a known reference dimension, and wherein the control device is configured to detect an actual location of the tool unit along the feed axis and to determine, on the basis of a displacement path of the tool unit when touching a workpiece that is arranged in the measurement region, by means of the at least two toggle measurement heads under consideration of the reference dimension and/or the basic distance an actual distance, particularly an actual diameter. Particularly, the at least two toggle measurement heads may be spaced in a direction that is parallel to and/or coincides with the feed axis. The basic distance may be for instance determined between two probe arms of the toggle measurement heads and/or probe balls or similar contact elements of the two probe arms. The at least two toggle measurement heads may form part of a measurement attachment.

In accordance with this refinement the measurement attachment is "oversized" with respect to the expected dimension of the to-be-measured workpiece which, however, may be compensated when measuring. For instance, when measuring a diameter of the workpiece, initially a first toggle measurement head of the at least two toggle measurement heads may be moved along the feed axis by means of a movement of the tool unit, at which the measuring device is received, until a measurement may take place. Subsequently, the workpiece may be touched by the second toggle measurement head of the at least two toggle measurement heads, for instance, at the opposite side, by accordingly moving the tool unit along the feed axis.

With this double touching, the displacement path of the tool unit may be determined. Departing from the basic distance which is determined by utilizing the known reference dimension, the actual distance may be simply determined. In this way, the machine tool is arranged, in accordance with an exemplary embodiment, to conduct a measurement which may combine elements of an absolute measurement and a relative measurement. Inaccuracies on the side of the machine, for instance deformations on the basis of operational heating or the like, may be regularly only reflected in the measurement result via the relative distance of the two absolute actual locations of the tool unit along the feed axis when touching. The measurement may be effected in a low-error fashion.

Influencing factors on the side of the machine may not impact on the measurement attachment as such, particularly on the basic distance between the at least two toggle measurement heads, in a considerable fashion. In contrast to in-process measuring, wherein the measurement attachment has to be adjusted to the expected measure in a high precision fashion, a significantly increased flexibility is provided. In this way, for instance, also with piece production, low volume scales or medium volume scales, a high manufacturing quality may be ensured with little efforts. Particularly with these applications, the time required for measuring in which for instance no engagement of the grinding wheel may take place, is not of huge significance. It goes without saying that the capability of detecting the actual location may be utilized for determining the displacement path. The displacement path may correspond to a distance of two actual locations of the tool unit along the feed axis when touching. The actual locations may be detected in an absolute or a relative fashion.

Known absolute measurement heads, as a rule, comprise at least two complex measurement cells each of which is respectively associated with a probe. Depending on the type, the probes are arranged in a movable fashion and for instance arranged in a scissor-shaped fashion or as legs that are arranged in a fashion basically parallel to one another and that are arranged to be moved to one another. Thus, the absolute measurement heads are, as a rule, arranged in a particularly complex fashion. Weight and installation size is enormous. Because of huge investment costs, absolute measurement heads are discarded as measurement means for a variety of applications. The complex structure of an absolute measurement head, wherein the measuring probes are arranged in a fashion moveable to one another, typically involves a reduction of the measuring accuracy. Such measurement heads may be implemented, because of their complex structure, only at huge costs.

By contrast, the combination of the measurement attachment including the at least two toggle measurement heads which comprise, in the first measurement configuration, a fixed basic distance to one another, with the movable tool unit—which is anyway provided—leads to increased measuring accuracies with considerably reduced structural efforts and cost efforts. As mentioned herein before, a deviation on the level of the machine, for instance the so-called thermal expansion, may be reflected in the measurement result only with a small relative measure, namely the difference between two actual locations of the tool unit. Calibrating the measuring device on the basis of the known reference dimension may effect that a large fraction of the basic distance is so-to-say reflected in the reference dimension in an error-free or low-error fashion.

With known in-process measurement heads, for instance, when a plurality of diameters at the same workpiece is to be grinded in a single setting, for each of these diameters separate measurement means must be provided, for instance respectively a separate measurement head. The measurement attachment comprising an "oversize" enables to examine each of these diameters when processing without the need to unclamp the workpiece. Also in this respect significantly reduced capital expenditures and installation space requirements may be enabled, while maintaining nearly the same accuracy.

It goes without saying that the term "bringing in" may be construed in a relative fashion. Bringing the workpiece in the measurement region between the at least two toggle measurement heads of the measuring device may be for instance effected in such a way that the toggle measurement heads are moved towards the workpiece. The at least two toggle measurement heads may be for instance arranged as tactile toggle measurement heads or as toggle measurement heads that are measuring contactless.

In an exemplary embodiment, the at least one toggle measurement head is received at an adapter piece which is adapted to the support piece and which is attachable to the support piece in a plurality of defined predetermined locations. For instance, when two toggle measurement heads are provided, to each toggle measurement head an adapter piece may be assigned. The adapter pieces may be received at the support piece in a mediate or an immediate fashion. A mediate attachment may be accomplished involving further parts that are disposed therebetween. By way of example, the support piece may provide a defined attachment geometry for at least one adapter piece, particularly for two adapter pieces. The attachment geometry may for instance comprise mating surfaces and/or a defined hole pattern for attachment elements. It goes without saying that a mating geometry at least partially corresponding to the attachment geometry may be provided at the at least one adapter piece. The at least one adapter piece may be connected with the support piece in a releasable fashion. To this end, for instance bolt and nut joints, clamping joints or the like may be suited. The attachment may further comprise also mating elements, for instance mating pins. Mating elements may enable high precision localization. It also goes without saying that the at least one toggle measurement head may be received at the respective support piece in a mediate or an immediate fashion. A mediate accommodation may be for instance accomplished involving a mating piece. The adapter pieces may be generally similarly shaped. However, it may be also envisaged to utilize adapter pieces that are differently shaped. This may involve for instance a first adapter piece and a second adapter piece, wherein the second adapter piece is different from the first adapter piece.

According to a further exemplary embodiment, the at least two toggle measurement heads are, in a second measurement configuration, received at the support piece in a fashion spaced from one another in a spatial direction in such a way that a toggle measurement head may axially touch the workpiece. This may take place in a Z-direction which extends parallel to a workpiece spindle axis, for instance. The Z-direction may for instance correspond to a workpiece axis. In this way, the workpiece may be axially approached and touched by a toggle measurement head, whereas the other (axially displaced) toggle measurement head does not axially contact the workpiece. Axial touching events may be performed for instance for determining axial dimensions of the workpiece. Further, by means of a plurality of axial touching events, for instance a planarity (or: flatness) of an axial surface of the workpiece may be determined.

According to a further exemplary embodiment at least one toggle measurement head comprises a curved probe arm which runs out at an angle with respect to a longitudinal axis of the toggle measurement head. Hence, the at least one toggle measurement head and/or its probe arm may be inserted into recesses and depressions at the workpiece. Further, by means of a curved probe arm a distance between two toggle measurement heads may be varied, for instance. It goes without saying that, for instance when two or more toggle measurement heads are used, at least one of them or rather a plurality of toggle measurement heads may be provided with a curved probe arm. Probe arms of toggle measurement heads may be regularly changed without huge efforts. Hence, by utilizing different probe arm geometries, the flexibility of the measuring device may be further increased. A "curved" probe arm may be regarded as a probe arm which may comprise different geometries. A "straight" probe arm is regularly arranged as a pin-shaped or rod-shaped rotational body whose axis coincides with the longitudinal axis of the toggle measurement head. The longitudinal axis of the toggle measurement head may correspond to a main extension direction of the toggle measurement head. By contrast, a curved probe arm may be bent or angled. Further, a curved probe arm may basically comprise an offset.

According to a further exemplary embodiment, the measuring device comprises a measurement attachment at which the at least two toggle measurement heads are received, wherein the measurement attachment is pivotable to bring the workpiece in the measurement region. In this way, the measurement attachment may be moved via a simple swiveling movement towards the workpiece so as to be able to perform touching events. This may be for instance accomplished by a linear drive, for instance a hydraulic cylinder. Due to the pivotable arrangement, collisions may be prevented which may occur for instance when displacing the tool unit in the course of a grinding machining process.

Apart from such a pivoting device generally no further separate driving installations are required for the measuring device. For instance, the measurement attachment may be arranged in a U-shaped fashion. In this connection, the first and the second toggle measurement head may form the legs of the U. The inner space of the U may define the measurement region.

In accordance with a further exemplary embodiment, the measuring device comprises a linkage mechanism that permits a pivoting between a measurement position and an out-of-engagement position.

A linkage mechanism may be arranged in a particularly space-saving fashion. By means of the linkage mechanism, two end positions may be defined, namely the measurement position and the out-of-engagement position, for instance. Particularly the measurement position may be achieved at high reproducibility by design measures, such as limit stops or the like.

When the measurement position and the out-of-engagement position are defined, for instance, by mechanical arrangements at the linkage mechanism, a simple drive element and/or actuation element may be selected for driving the measuring device. Complicated control devices for the linkage mechanism may be avoided in this way. In the alternative, instead of a linkage mechanism, for instance, rotational joints comprising a defined swiveling range or pivoting arms that are coupled with controllable motors may be provided. In accordance with an exemplary embodiment, when the motors comprise a high positional accuracy.

According to a further exemplary embodiment, the basic distance and the actual distance comprise a ratio of about maximal 2:1. According to a further exemplary embodiment, the basic distance and the actual distance comprise a ratio of about maximal 1.5:1. According to another exemplary embodiment, the basic distance and the actual distance comprise a ratio of about maximal 1.2:1. According to yet another exemplary embodiment, the basic distance and the actual distance comprise a ratio of about maximal 1.1:1. The smaller the ratio between the basic distance and the actual distance, the smaller become machine-side influences for the determination of the actual distance.

By contrast, when a great ratio between the basic distance and the actual distance is provided, an increased flexibility of the measuring device may be achieved. The measurement attachment may be suited for a variety of actual distances, particularly actual diameters. Machine-side influences are basically only taking effect via the displacement path which for instance corresponds to the difference between the basic distance and the actual distance.

The basic distance may be determined by moving the tool unit along the feed axis and by touching the reference dimension which is received in the workpiece mount on both sides, under consideration of the displacement path of the tool unit. When a low ratio between the basic distance and the reference distance is provided, a huge accuracy for the determination of the basic distance may be ensured. Greatest accuracies may be achieved when the reference dimension almost corresponds to the basic distance, i.e. is only slightly smaller.

According to a further exemplary embodiment, at least one toggle measurement head of the at least two toggle measurement heads is deflectable in a proportional range, wherein the control device is arranged to detect the deflection of the at least one toggle measurement head. To this end, the at least one toggle measurement head may be provided with a displacement transducer for detecting the deflection. Displacement transducers may be arranged for instance as inductive displacement transducers, capacitive displacement transducers or as potentiometer transmitters. Further principles for detecting the deflection may be envisaged. A detection of the deflection may be also achieved via strain gauges, for instance. Further, also piezo elements could be utilized. Deflectable measuring probes generally enable, at least in the proportional range, a high-precision location detection. The deflection of the at least one toggle measurement head may be considered when determining the actual distance. In this way, for instance absolute influences of the machine when displacing the tool unit to touch the workpiece may be detected and compensated. Being aware of the deflection of the at least one toggle measurement head, the displacement path of the tool unit may be rectified.

By contrast, according to further exemplary embodiments, toggle measurement heads may be utilized that are merely arranged to output one actuation signal (also: trigger signal). In other words, the toggle measurement heads may exhibit for instance two states ("contact" or "no contact") but may not output intermediate states. Toggle measurement heads of this kind may be also basically arranged in a deflectable fashion. By way of example, via a minimum deflection of a probe arm, a touching event may be detected. Such a deflection may vary the state of a circuit of the toggle measurement head (open or close), for instance. Toggle measurement heads of that kind are more cost efficient than measurement heads that comprise complex internal displacement detection systems.

According to a further exemplary embodiment, the workpiece is arranged to be received at a workpiece spindle which is selectively drivable about a workpiece spindle axis in a rotating fashion, wherein the workpiece spindle axis is arranged perpendicular to the feed axis, and wherein the tool spindle preferably comprises a tool spindle axis which is arranged in a fashion parallel to the workpiece spindle axis. A workpiece spindle which is arranged in such a way may be also referred to as C-axis. A controlled C-axis may enable a focused measurement of actual distances at different positions along the circumference of the workpiece. By touching the workpiece with the at least one toggle measurement head in a repeated fashion, the field of application of the measuring device may be extended. Particularly in combination with the workpiece spindle which is drivable about the workpiece spindle axis in a selective fashion, i.e. the C-axis, for instance an out-of-roundness of the workpiece may be detected. In this way, also tolerances of shape may be inspected.

According to a refinement, the tool unit is drivable parallel to the workpiece spindle axis with respect to the workpiece. In this way, actual distances may be determined at a variety of different axial positions of the received workpiece. An axial displacement of the tool unit further permits an axial touching of the workpiece by the at least one toggle measurement head. Besides the determination of radial dimensions or distances, thus also axial geometric elements or distances may be detected.

According to a further exemplary embodiment, the control device is arranged to, in a coupled movement, selectively move the tool unit along the feed axis and to selectively drive the workpiece spindle about the workpiece spindle axis. A coupled movement of this kind permits the detection of eccentric geometries, for instance of crank pins of a crankshaft or of cam surfaces of a camshaft, or of further out-of-roundness entities. It may be envisaged to detect the respective actual distances by a double-sided touching with both toggle measurement heads along particular locations at the revolving eccentric workpiece. In addition or in the alternative, for instance by repeated touching, over and above, surface inaccuracies may be detected, when the tool unit is moved in such a way that the toggle measurement head is brought into repeated contact with the revolving workpiece. By means of the afore-mentioned functionality, for instance also longitudinal grooves or similar geometric elements may be detected which basically axially extend at the workpiece. This may further involve for instance spline shaft profiles, tooth profiles, polygonal profiles or such like.

According to a further exemplary embodiment, the control device is configured to, in a coupled movement, further selectively move the tool unit parallel to the workpiece spindle axis. Hence, besides of roundness tolerances which may be limited for instance to an axial position of the workpiece, further also cylindrical shape deviations may be determined, for instance. To this end, the tool unit including the measuring device may be axially moved along the workpiece when probing. The touching may be performed for instance along a spiral path at the workpiece.

The tool unit may for instance comprise a cross-table or may be received at a cross-table which provides guides for the feed axis and the movement with respect to the workpiece spindle axis (for instance parallel movement). However, it goes without saying that the tool unit may be also differently shaped and guided, respectively. Basically, for instance a cross-table including two guides could be dispensed with. The tool unit could be received at a guide for the feed axis, for instance. A movement of the tool unit parallel to the workpiece spindle axis in this respect may be basically effected also by a movement of the received workpiece parallel to the tool unit. Further embodiments may be envisaged.

According to a further exemplary embodiment, the control device is configured to selectively displace the tool unit including the measuring device in a fast gear or a probe gear. In this way, an optimum between time saving by increasing the displacement velocity and operational safety may be maintained. In the probe gear, for instance in a crawler gear, the tool unit may be abruptly stopped. This may be take place for instance even in cases when the measurement attachment indicates that at least one of the at least two toggle measurement heads touches the workpiece with a defined touching force. Feed movements where no collisions have to be feared, however, may be effected with high acceleration and velocity, respectively.

According to a further exemplary embodiment, the control device is configured to, on the basis of the actual distance of the workpiece, particularly of the actual diameter, selectively drive and displace the tool unit and the tool in a downstream machining operation. In this way, in the course of the measurement of the workpiece, a correction value may be determined on which a downstream machining operation may be based, for instance. In this way, the workpiece may be safely brought to the required final dimensions on a piece-by-piece basis by alternatingly measuring and correcting. On the basis of the correction value, the control device may feed the tool unit in a targeted fashion and drive the tool in a defined fashion.

According to a further exemplary embodiment, the control device is coupled to a position transducer of the tool unit, at which the actual location of the tool unit may be detected. The position transducer may be for instance coupled to an incremental or absolute measure which permits a high precision detection of the actual location of the tool unit along the feed axis. A comparison of different actual locations of the tool unit permits a high precision determination of the displacement path.

In respect of the machine control method, in accordance with another aspect of the present disclosure, the above and further objects of the present disclosure are achieved by a method for measuring a workpiece in a machine tool, particularly a grinding machine, the method comprising the following steps:

providing a modular measuring device that is movable with respect to a workpiece along a feed axis, wherein the workpiece is received at a workpiece mount, wherein the measuring device is received at a tool unit of a tool spindle, wherein the measuring device comprises at least one toggle measurement head which is received at a support piece which provides a plurality of defined predetermined locations of the at least one toggle measurement head, moving the tool unit with respect to the workpiece, detecting signals that are triggered by the at least one toggle measurement head when touching a workpiece, and determining an actual position of the at least one toggle measurement head on the basis of an actual location of the tool unit.

In this way, a significantly enlarged functionality may be easily provided without substantial additional efforts. A variety of different measurement tasks may be processed. Absolute and/or relative measurements may be accomplished.

The method may be refined by the following steps:

providing a modular measuring device that comprises at least two toggle measurement heads that are received at a support piece in a manner spaced to one another, which support piece provides a plurality of defined predetermined locations for the at least two toggle measurement heads, preparing a measurement, comprising:

setting a basic distance between the at least two toggle measurement heads which is greater than a known reference dimension of a reference geometry and which defines a measurement region, receiving the reference geometry at the machine tool, inserting the reference dimension in the measurement region, displacing the measuring device with respect to the reference geometry and touching the reference dimension by means of the toggle measurement head, thereby detecting the actual location of the measuring device, thus detecting the displacement path of the measuring device, and determining the basic distance under consideration of the reference dimension and the actual locations of the measuring device when touching, performing at least one measurement, particularly for determining a workpiece diameter, comprising:

receiving a workpiece at the machine tool, bringing a measurement geometry of the workpiece in the measurement region, touching the measurement geometry of the workpiece by means of the toggle measurement heads, thereby detecting the displacement path of the measuring device, and determining an actual distance of the measurement geometry under consideration of the basic distance and the displacement path of the measuring device when touching.

It goes without saying also in this respect that the step of inserting may be accomplished by a relative movement between the reference dimension of the reference geometry and the measuring device. By means of the method, an adjustment or a calibration of the measuring device may be easily carried out. Hereafter, the measuring device with the at least two toggle measurement heads is arranged for measuring a variety of workpiece geometries, provided that they are insertable in the measurement region.

After a singular adjustment of the measuring device on the basis of a known reference dimension, the measuring device may be utilized for a variety of measuring events. The measuring may be for instance implemented in a manufacturing process which may involve for instance a coarse machining, a fine machining and a finish machining at a workpiece which is once-only clamped.

It goes without saying that the actual location of the measuring device which may be utilized for the determination of the displacement path of the measuring device may be considered as absolute locations or rather as relative locations with respect to a measure scale. When detecting the actual distance, the displacement path of the measuring device may be determined in a relative or an absolute fashion.

The method may be particularly carried out with a machine tool with one of the afore-mentioned aspects. It goes without saying that also the method may be further developed in accordance with one or more aspects of the above-mentioned machine tool, and vice versa.

In a further aspect of the present disclosure there is provided a machine tool control program comprising program code which is configured to cause a control device to carry out steps of the method in accordance with any of the afore-mentioned aspects, when the machine tool control program is executed on the control device. The machine tool control program may be disposed on a computer readable non-transitory data storage medium.

In yet another aspect of the present disclosure, there is provided a computer readable non-transitory medium having instructions stored thereon which, when carried out on a computing device of a machine tool, cause the machine tool to perform the steps of a method in accordance with the present disclosure. The program code (or: logic) may be encoded in one or more non-transitory, tangible media for execution by a computing machine, such as a computer. In some exemplary embodiments, the program code may be downloaded over a network to a persistent storage from another device or data processing system through computer readable signal media for use within the device. For instance, program code stored in a computer readable storage medium in a server data processing system may be downloaded over a network from the server to the device. The data processing device providing program code may be a server computer, a client computer, or some other device capable of storing and transmitting program code.

It goes without saying that features of the present disclosure that have been mentioned hereinbefore and will be described hereinafter can be used not only in the respectively specified combination, but also in other combinations or in isolation without departing from the scope of the present disclosure.

BRIEF DESCRIPTION OF THE DRAWINGS

Further features and exemplary embodiments of the present disclosure are disclosed in the following description of a plurality of exemplary embodiments, with reference to the drawings, wherein.

DETAILED DESCRIPTION OF EXEMPLARY EMBODIMENTS

Figure 1:
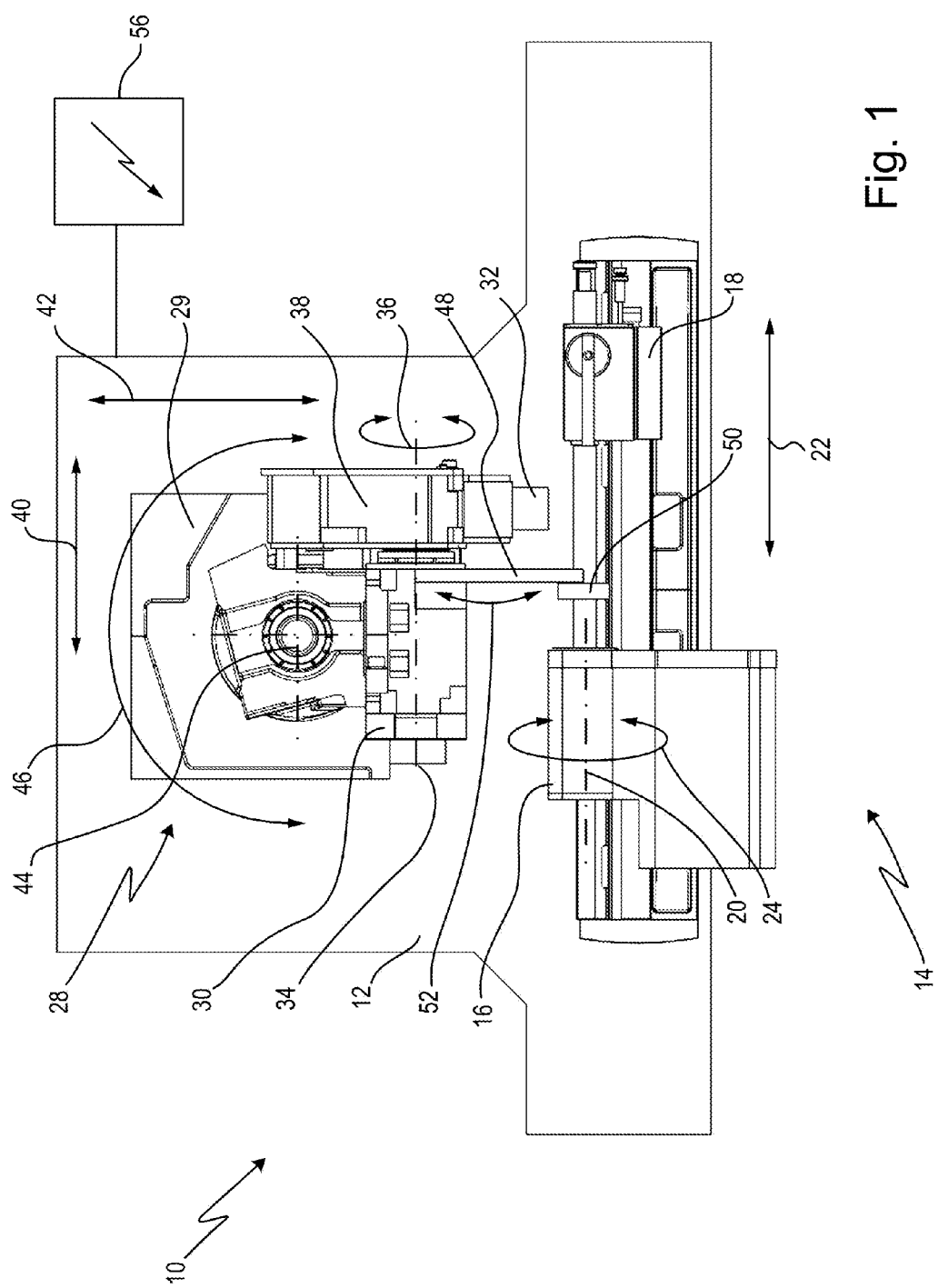
FIG. 1 is a top view of a machine tool.

A machine tool is shown in FIG. 1 and in its entirety designated by 10. In the present case, the machine tool 10 is arranged as a grinding machine. It goes without saying that the following illustrations do not have to be necessarily true to scale. Rather, for instance for illustrative purposes, deviations from a common scale may occur. This may be the case when comparing different figures but also with respect to illustrations within a single figure. The machine tool 10 comprises a support table 12 which may be arranged, for instance, as part of a frame. A workpiece mount 14 is arranged and guided at the support table 12. The workpiece mount 14 comprises a workpiece spindle headstock which is provided with a workpiece spindle 16. A tailstock 18 is associated with the workpiece spindle 16. A workpiece (not shown in FIG. 1) may be received between the workpiece spindle 16 and the tailstock 18.

The workpiece spindle 16 comprises a workpiece spindle axis 20 about which the workpiece is rotationally drivable, where applicable, refer also to an arrow designated by the reference numeral 24. The workpiece spindle axis 20 may be also referred to as C-axis. A C-axis may allow for a targeted, controlled rotation of a workpiece which is received at the workpiece mount 14. An arrow designated by reference numeral 22 indicates an allowed displacement motion along a so-called Z-axis, refer also to FIG. 2. Along the Z-axis, a relative motion between the workpiece and a machining tool may be accomplished. To this end, either the workpiece, or the tool, or however both of these together may be moved along the Z-axis. The Z-axis is arranged parallel to the workpiece spindle axis 20 or, however, congruent with respect thereto.

Further, a tool unit 28 is arranged at the support table 12 of the machine tool 10. The tool unit 28 may comprise a tool table 29. The tool table 29 may be arranged, for instance, as a cross-table. Other embodiments may be envisaged. The tool unit 28 comprises a tool spindle 30 which is arranged, in the present case, for instance, as a grinding head. At the tool spindle 30, a tool 32, for instance a grinding wheel, is received. The tool 32 may be set in rotation about a tool spindle axis 34 by the tool spindle 30, refer an arrow that is designated by reference numeral 36. In FIG. 1, the tool 32 is only partially visible. The tool unit 28 further comprises a shroud 38 which covers a large portion of the tool 32.

In particular when the tool unit 28 comprises a tool table 29 that takes the form of a cross-table, the tool spindle 30 may be moved with respect to the workpiece mount 14 along an arrow designated by 40. The arrow 40 may be associated to the Z-axis, refer to FIG. 2. Particularly when it is not intended to longitudinally displace the workpiece mount 14 along the arrow 22 when machining the workpiece, the relative movement between the workpiece and the tool 32 may be effected by moving the tool spindle 30 including the tool 32 mounted thereon along the arrow 40.

An arrow designated by reference numeral 42 indicates a feed direction which may be associated to an X-axis, refer again to FIG. 2. Along the X-axis, the tool 32 may be fed towards the workpiece so as to engage the workpiece. The X-axis may be also referred to as feed axis, refer to the feed axis 70 in FIG. 2. The movement along the X-axis or the feed axis 70 may be guided by appropriate guide means of the tool table 29 and/or the support table 12.

By way of example, the tool unit 28 of FIG. 1 further comprises a B-axis 44. In the view according to FIG. 1, the B-axis 44 is oriented perpendicular to the view plane. The B-axis 44 enables the tool spindle 30 to pivot, refer to a pivoting arrow designated by 46. The B-axis 44 may enable to provide a plurality of tool spindles 30 with tools 32 at the tool unit 28. These may be moved, where required, into a machining position by pivoting the B-axis 44. In this way, flexible machining may be enabled, for instance with tools 32 including different abrasive materials. Hence, different grinding wheels may be brought into engagement with the workpiece without particular setting efforts for rough machining, fine machining or finish machining, for instance. An association of the B-axis 44 to the Z-axis, refer to the arrows 22 and 40, and/or to the X-axis, refer to the arrow 42, may be basically arranged in a fashion that is different from FIG. 1. For instance, in the alternative, the B-axis 44 may be arranged in a fashion parallel to the workpiece spindle axis 20 and/or the tool spindle axis 34. With such an arrangement, a further tool may be arranged at an extension arm which is received at the tool spindle 30 and which is pivotable for pivoting-in the further tool about the tool spindle axis 34 towards the workpiece (not shown in FIG. 1).

It goes without saying that the machine tool 10 may be also arranged without the B-axis 44, particularly when only one tool spindle 30 is provided.

Figure 2:
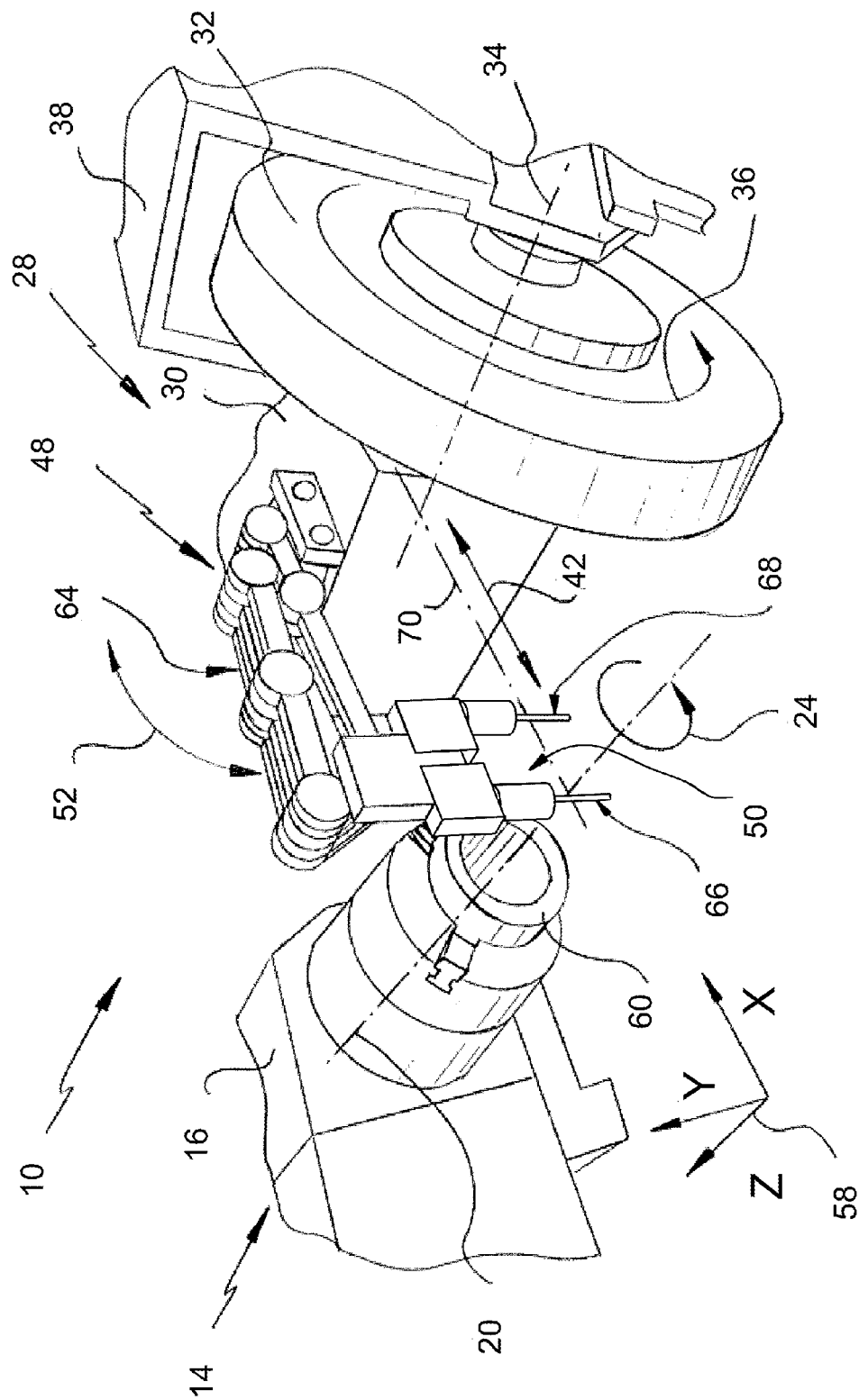
FIG. 2 is a perspective partial view of a machine tool based on FIG. 1.

A measuring device 48 is arranged at the tool spindle 30, refer also to FIG. 2. The measuring device 48 comprises a measurement attachment 50. An arrow designated by 52 indicates that the measuring device 48 including the measurement attachment 50 is arranged at the tool spindle 30 in a pivotable fashion.

The machine tool 10 further comprises a control device 56 which is particularly arranged for controlling the workpiece mount 14 including the workpiece spindle 16, the tool unit 28 including the tool spindle 30, the tool 32 and, where applicable, the B-axis 44 and/or the workpiece spindle axis 20 in a targeted fashion to drive the same and/or displace the same. Movements, in this case, may be performed along the X-axis or the Z-axis. Further, the control device 56 may be configured for receiving operating parameters, for instance location parameters, from components of the machine tool 10. The control device 56 may for instance comprise a detection unit, an evaluation unit, and a control unit.

A coordinate system 58 is shown in FIG. 2 for illustrating the axes X, Y, Z of the machine tool 10. Needless to say, the aforementioned axes and directions serve primarily for illustrative purposes and not for the purpose of restricting the scope of the present disclosure. It further goes without saying that movements of components of the machine tool 10 with respect to one another may be basically performed in a fashion relative to each other. This means that if, for instance, a first element is to be movable with respect to a second element, and either the first element or the second element may perform the movement. It is also conceivable to commonly move both elements.

In FIG. 2, at the workpiece spindle 16 of the workpiece mount 14, a workpiece clamping device 60 is received which may be arranged as a clamping chuck. For illustrative purposes, an illustration of several components of the machine tool 10 is dispensed with in FIG. 2. For instance, no tailstock 18 is shown. It goes without saying that in particular with short workpieces, a one-sided mounting at the workpiece clamping device 60 may be sufficient. By contrast, for instance particularly long and/or thin-walled workpieces may be additionally supported by at least one steady rest (not shown) interposed therebetween in addition to the workpiece spindle 16 and the tailstock 18, refer to FIG. 1.

The measuring device 48 comprises a pivoting-in mechanism which may be arranged as a linkage mechanism 64, for instance. The measuring device 48 is arranged at the tool spindle 30 (and/or the tool unit 28) and may be moved along the feed axis 70 together with the same. The feed axis 70 may correspond to the X-axis or may be arranged parallel to the same. The arrow 42 indicates an associated back- and forth movement.

In FIG. 2, the measuring device 48 is arranged in the measurement position. In the measurement position, the measurement attachment 50, comprising a first toggle measurement head 66 and a second toggle measurement head 68 is moved in and/or pivoted in a region of the workpiece spindle axis 20.

Figure 3A:
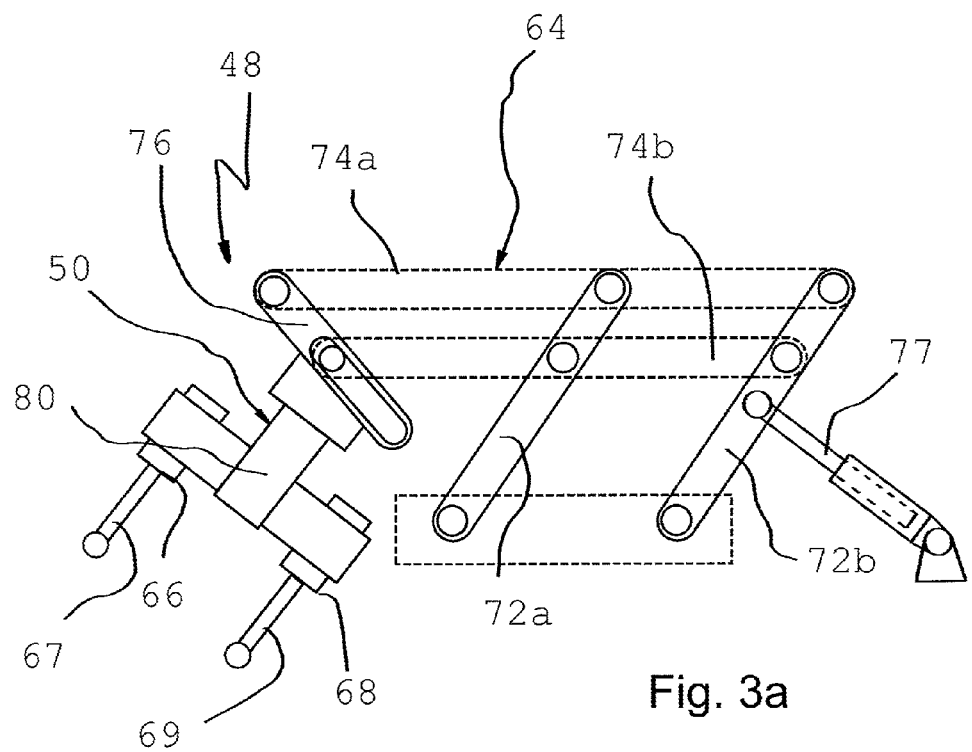
FIG. 3a, 3b show side views a measuring device of a measuring device for usage in a machine tool according to FIG. 2 in an out-of-engagement position and a measurement position.
Figure 3B:
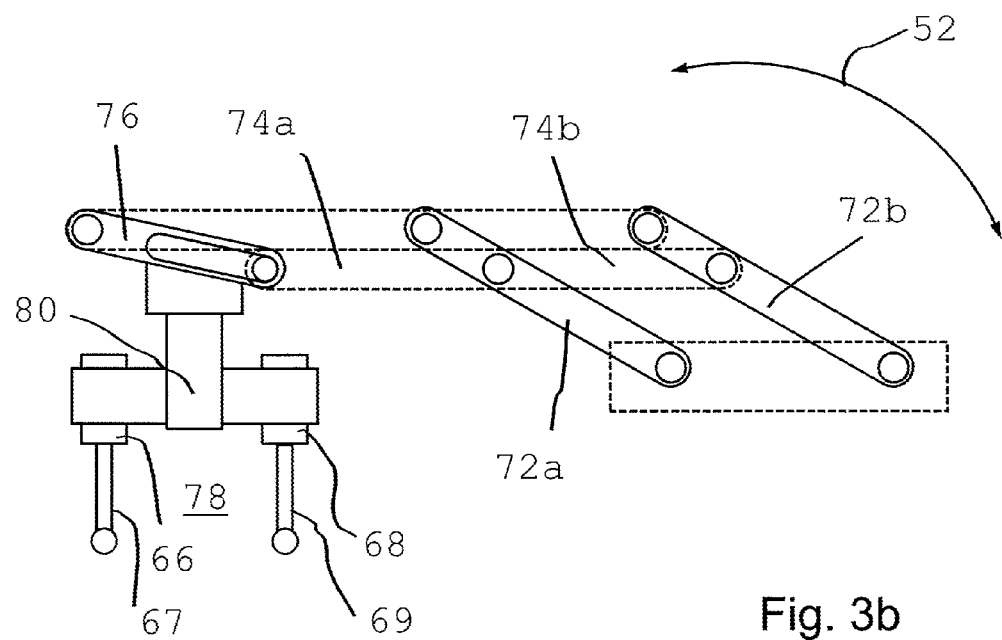

In FIGS. 3a and 3b, an exemplary arrangement of the measuring device 48 is elucidated. The measuring device 48 comprises a pivoting mechanism which is embodied by the linkage mechanism 64. The linkage mechanism 64 is, in the present case, arranged as a double rocker. Further mechanisms to provide the pivoting-in functionality of the measuring device 48 are conceivable.

The linkage mechanism 64 comprises two coupling elements 72a, 72b which may be arranged for instance as rockers. The rockers 72a, 72b are arranged at the tool spindle 30 in a rotatable fashion, refer also to FIG. 2. The rockers 72a, 72b are respectively connected to coupling elements 74a, 74b which may be arranged as links, for instance. With the length ratios illustrated in FIGS. 3a and 3b, for both the rockers 72a, 72b and the links 74a, 74b, a parallel guide with respect to one another may be present when pivoting, refer to the arrow 52. Other length ratios are easily conceivable.

The links 74a, 74b may be connected to an extension arm 76 in their front region. The extension arm 76 is connected to the link 74a by means of a pivot joint, for instance. The link 74b is connected to the extension arm 76 by means of a longitudinal groove, for instance. The linkage mechanism 64 may be for instance arranged such a way that defined enabled installation space requirements can be met. Particularly in contrast to a pure pivoting arm, installation space advantages may be present. However, it goes without saying that the pivoting of the measuring device 48 may be effected in a different fashion. In FIG. 3a, an actuating cylinder 77 is indicated which is coupled to the rocker 72b. When extending the actuating cylinder 77, the linkage mechanism 64 may be pivoted. Further drive means and pivot points for the pivoting may be envisaged.

At the extension arm 76, a support piece 80 is received. The support piece 80 and the extension arm 76 may be arranged in an integral fashion. Basically, the support piece 80 and the extension arm 76 may be also arranged in a multiple piece fashion. To each of the toggle measurement heads 66, 68 of the measurement attachment 50 a probe arm 67, 69 may be associated. The probe arms 67, 69 may comprise probe balls or similar design elements through which a workpiece may be touched.

The view as shown in FIG. 3b may correspond to the measurement position according to FIG. 2. In contrast, FIG. 3a elucidates for instance an out-of-engagement position of the measuring device 48. In the measuring position according to FIG. 3b, the measurement attachment 50 including the first toggle measurement head 66 and the second toggle measurement head 68 may embrace a workpiece in such a way that mutual touching is enabled. The toggle measurement heads 66, 68 and/or their probe arms 67, 69 define a measurement region 78 which for instance may define the maximum extension of a to-be-measured workpiece and/or a to-be-measured section of the workpiece.

Figure 4:
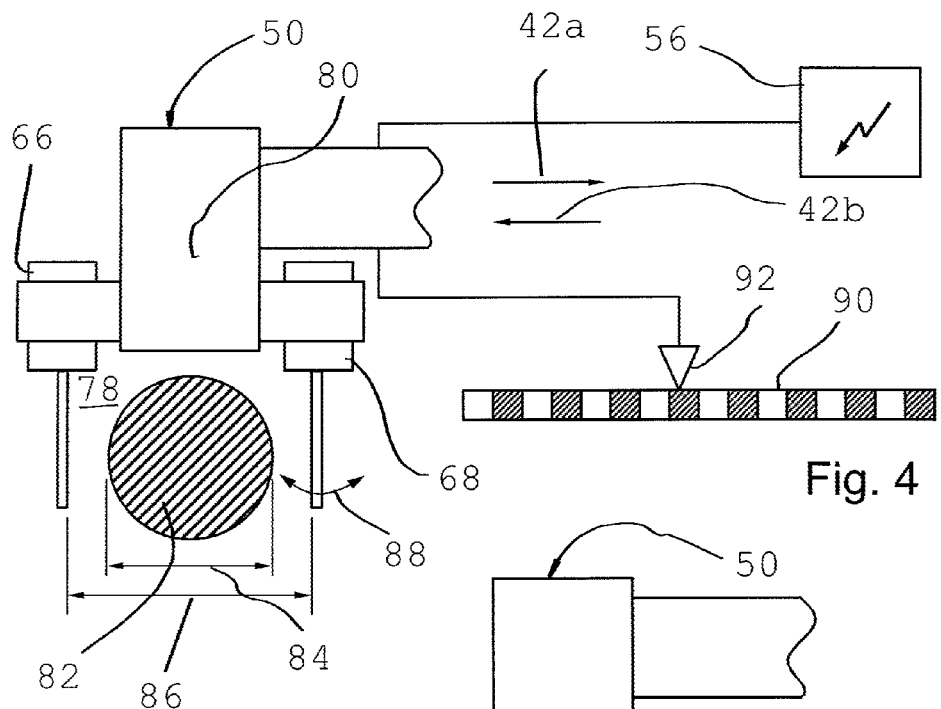
FIG. 4 is a simplified schematic view of a measurement attachment and a reference workpiece.

FIG. 4 exemplarily illustrates how the measurement attachment 50 of the measuring device 48 including the toggle measurement heads 66, 68 may be adjusted before measuring. To this end, a known reference geometry 82, for instance of a reference workpiece, may be inserted in the measurement region 78. The reference workpiece including the reference geometry 82 may be for instance arranged at the workpiece mount 14 of the machine tool 10. Inserting in the measurement region 78 may be effected by pivoting the measuring device 48.

The reference geometry 82 of the reference workpiece comprises a known reference dimension 84. For adjusting and/or for calibrating the measurement attachment 50, the reference dimension 84 and/or the reference geometry 82 may be sidedly (laterally) touched with the first toggle measurement head 66 and/or the second toggle measurement head 68 in a reciprocal fashion. The corresponding movements of the tool spindle 30, refer to FIG. 2, are indicated by the arrows 42a, 42b. The measurement attachment 50 is exemplarily associated via the pivoting-in mechanism 64 (refer to FIG. 3a and to FIG. 3b) and the tool spindle 30 with a position transducer 92 and a measuring scale 90 which may for instance indicate an actual location of the tool unit 28 along the feed axis 70.

It goes without saying that the measurement attachment 50 and/or the toggle measurement heads 66, 68 may also cooperate in a similar fashion with a measurement scale which may for instance indicate an actual location of the tool unit 28 along a longitudinal axis (or: advancement axis) (not shown in FIG. 4). This axis may be oriented parallel to the Z-axis. In this way, a location determination in two dimensions (2D) may be effected. In case the tool unit 28 in total is further also movable along the Y-axis with respect to the workpiece, either mediately or directly, also along this axis a location detection may be similarly effected. Thus, according to further embodiments the location of the measurement attachment 50 and/or the toggle measurement heads 66, 68 may be detected in three dimensions (3D).

When respectively touching the reference geometry 82 with the first toggle measurement head 66 and the second toggle measurement head 68, associated actual locations may be detected. From the distance between those actual locations and the known reference dimension 84, a basic distance 86 may be simply determined. The basic distance 86 may serve as a basis for subsequent measurements at workpieces. Positional data detected by the position transducer 92 may be for instance delivered to the control device 56 for evaluation. The location detection may also be effected in a different fashion. The position transducer 92 may be for instance arranged as an incremental transducer or an absolute transducer. Further, optical, inductive, capacitive or magnetic measurement principles may be utilized, for instance.

In FIG. 4 an arrow designated by 88 further indicates that the second toggle measurement head 68 may be arranged so as to be deflectable by a certain value, for instance. According to some embodiments, such a deflection of the toggle measurement head 68 may be detected and transmitted to the control device 56. The first toggle measurement head 66 may be similarly arranged. When touching the reference geometry 82 in the course of the gaging procedure, for instance the first toggle measurement head 66 and the second toggle measurement head 68 may be calibrated in their neutral position, i.e. without a considerable deflection. To this end, for instance the actual location of the tool spindle 30 along the feed axis 70 may be varied until the positional signal that is respectively output by the toggle measurement heads 66, 68 is approximately zero. In such a neutral position, for instance so-called measurement circuits of the first and second toggle measurement head 66, 68 may be zeroed, if possible and necessary. In subsequent measurements, the deflection of the first toggle measurement head 66 and/or the second toggle measurement head 68, when touching, may be considered in addition to the actual locations of the tool spindle 30 along the feed axis 70 to determine precise distances. Such functionality may, however, merely relate to some exemplary embodiments which may utilize an extended functionality of the toggle measurement heads 66, 68. According to alternative exemplary embodiments, the toggle measurement heads 66, 68 may be arranged in a simplified fashion.

Figure 5A:
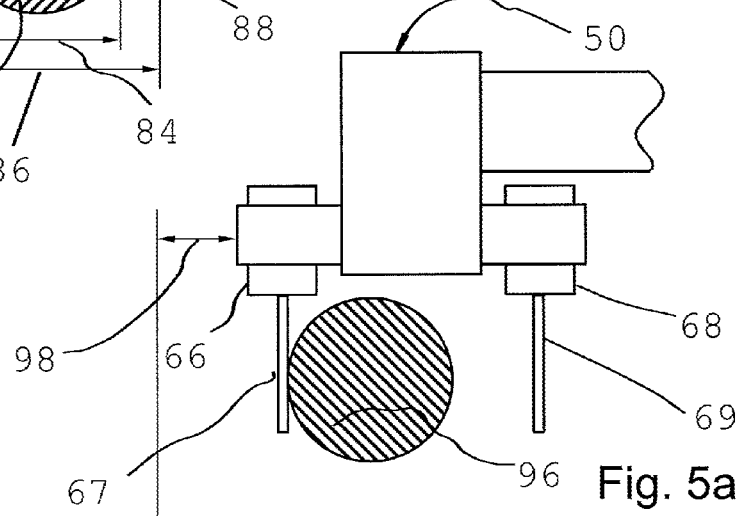
FIG. 5a, 5b show different locations of the measurement attachment according to FIG. 4 when touching a workpiece.
Figure 5B:
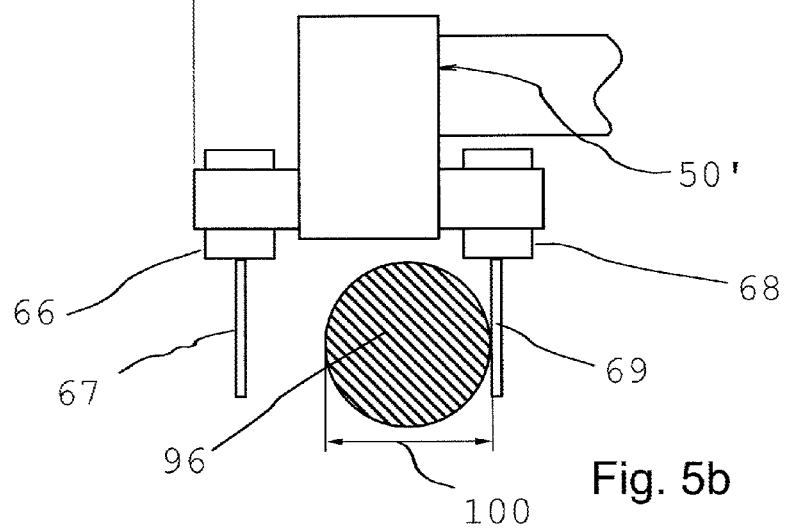

The determination of a diameter of a workpiece 96 is exemplarily illustrated in FIGS. 5*a* and 5*b*. In FIG. 5*a*, the first toggle measurement head 66 of the measurement attachment 50 comes into contact with the workpiece 96. A sequent movement of the tool spindle 30 and thus also of the measurement attachment 50 effects that also the second toggle measurement head 68 comes into contact with the workpiece 96 at the opposite side. The displacement path of the tool spindle 30 is illustrated by an arrow indicated by 98. Having knowledge of the basic distance 86, refer to FIG. 4, and the displacement path 98, an actual distance 100, particularly an actual diameter, of the workpiece 96 may be easily determined. Similar measurements for the detection of distances may be performed in different spatial directions. By means of a combination of a plurality of displacement axes which may act as measurement axes, distances in the two-dimensional space or even in the three-dimensional space may be determined.

The deflection of the toggle measurement head 68 and/or the toggle measurement head 66 which is indicated in FIG. 4 by the arrow 88 may for instance generate correction values which may be considered when detecting the actual distance 100. In the alternative, when respectively touching with the first and/or the second toggle measurement head 66, 68, the tool spindle 30 may be moved until the signal output by the toggle measurement heads 66, 68 corresponds to a neutral position, i.e. a zero-deflection or a nearly-zero-deflection, for instance. However, these variants merely apply to some envisaged embodiments of the toggle measurement heads 66, 68.

When determining the actual distance 100, machine-sided influencing factors, for instance the thermal expansions of the machine tool 10, may basically affect the measurement result only via the small displacement path 98. The "oversize" which may correspond to the difference between the basic distance 86 and the reference distance 84, permits a measurement of a variety of different workpieces 96 comprising different dimensions.

Figure 6A:
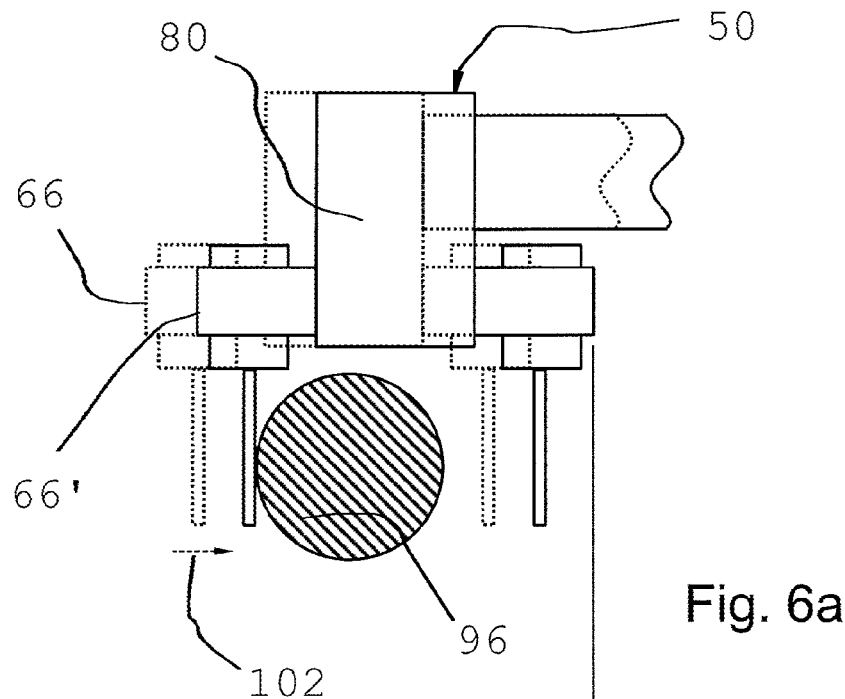
FIG. 6a, 6b show different locations of the measurement attachment according to FIG. 4 when touching a workpiece with a control regime which is modified with respect to the depiction according to FIG. 5a, 5b.
Figure 6B:
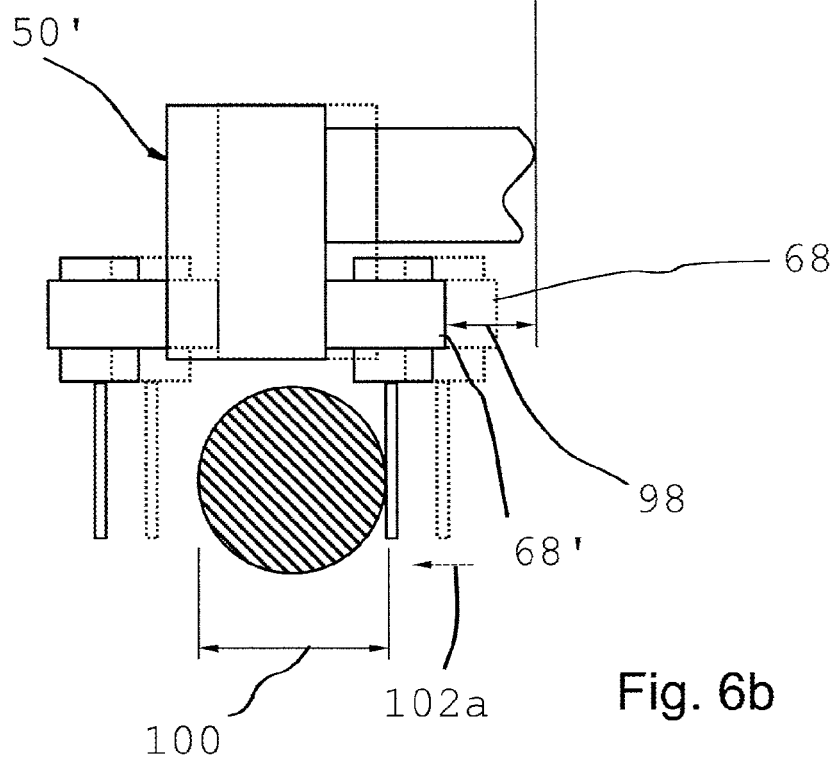

In FIGS. 6*a* and 6*b*, a measurement procedure is elucidated which is basically similar to the one of FIGS. 5*a* and 5*b*. Touching the workpiece 96 is however accomplished with different feed velocities or touching velocities. In accordance with an exemplary embodiment, the toggle measurement head 66 may be moved in a rapid gear and/or a fast gear to a pre-position in which the same does not touch the workpiece 96. For avoiding damages at the measurement attachment 50 and/or the workpiece 96, departing from the pre-position, a further feeding in a probe gear may be effected until the toggle measurement head 66' touches the workpiece 96.

Similarly, the touching event of the toggle measurement head 68 may be performed by initially moving the same in a fast gear to a pre-position. Departing from the pre-position, a further feeding and/or the further touching in a slow probe gear may be accomplished, refer to an arrow designated by 102*a*. The toggle measurement head 68' has touched the workpiece 96. Based on the displacement path 98 and the known basic distance 86, the actual distance of the workpiece 96 may be determined.

Figure 7:
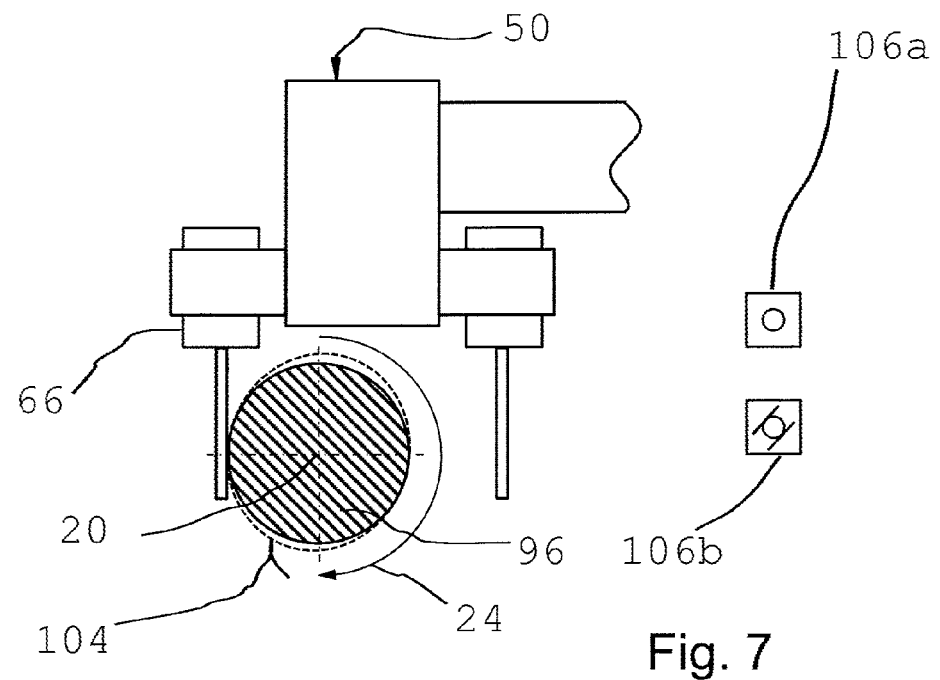
FIG. 7 is a view of a measurement attachment according to FIG. 4 when detecting form tolerances of workpiece.

FIG. 7 illustrates that the measurement attachment 50 may permit further applications. The workpiece 96 to-be-inspected in FIG. 7 comprises a shape deviation indicated by 104. This may involve for instance a roundness deviation and/or a cylindrical shape deviation, refer for instance to tolerance symbols indicated by 106*a*, 106*b*. The toggle measurement head 66 may be arranged in a deflectable fashion and in accordance with some embodiments detect the shape deviation 104 in a continuous or discontinuous fashion when the workpiece 96 revolves about the workpiece spindle axis 20. In an exemplary embodiment, the toggle measurement head 66 comprises a large proportional range so as to be able to detect large deviations. However, according to further exemplary embodiments, the toggle measurement head 66 is arranged as a trigger switch (also: control pulse trigger). Accordingly, the toggle measurement head 66 does not have to detect the deflection (e.g. of a probe arm) in a high-precision fashion, but rather may generate an actuation pulse (trigger pulse) at a defined deflection. This characteristic may also apply to the toggle measurement head 68.

Cylinder shape tolerances may be for instance detected when the tool spindle 30 to which the measuring device 48 is attached, is moved along the Z-axis parallel to the workpiece spindle axis 20 when the workpiece 96 revolves. By way of example, in this way a cylinder surface may be touched along a spiral path. In this way, the workpiece 96 may be "scanned".

Figure 8:
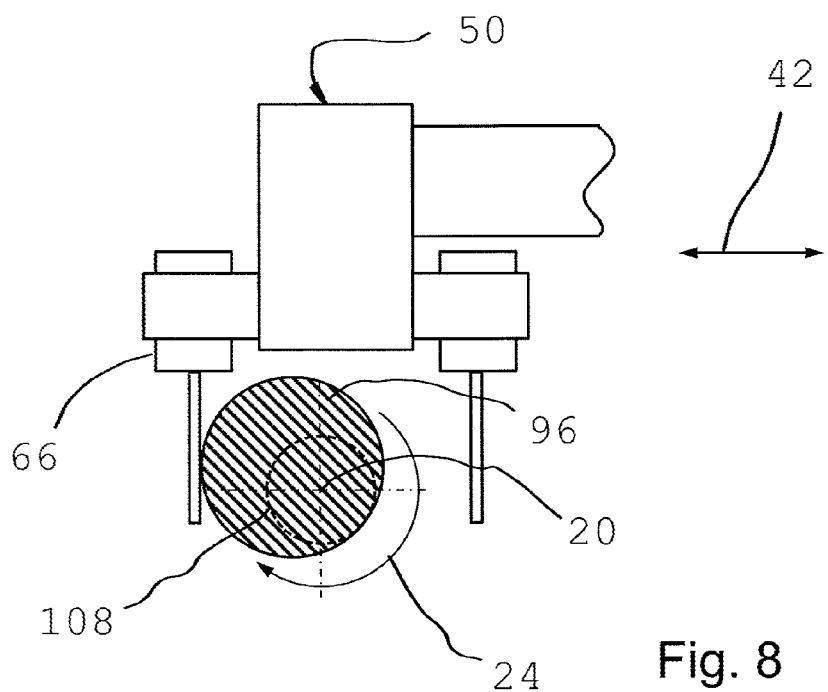
FIG. 8 is a view of the measurement attachment according to FIG. 4 when touching a workpiece which revolves in an eccentric fashion.

In FIG. 8, the workpiece 96 is arranged in such a way that an eccentric section arranged around a centric section 108 revolves about the workpiece spindle axis 20. Workpieces 96 that are arranged at least sectionally in such an eccentric fashion may be for instance measured when the control device 56 is configured for simultaneously driving the tool spindle 30 along the X-axis, i.e. the feed axis 70, and the workpiece 96 about the so-called C-axis which, in the present case, coincides with the workpiece spindle axis 20. By way of example, the coupled movement may follow expected contact locations of the first toggle measurement head 66 at the workpiece 96 when the workpiece 96 revolves in an eccentric fashion. Also in this way basically roundness tolerances or cylinder form tolerances may be detected, for instance. It may be, however, also envisaged to sectionally drive eccentric workpieces 96 and to respectively detect actual distances, for instance actual diameters, with both toggle measurement heads 66, 68 in analogy to the FIGS. 5a, 5b and/or FIGS. 6a, 6b.

Figure 9:
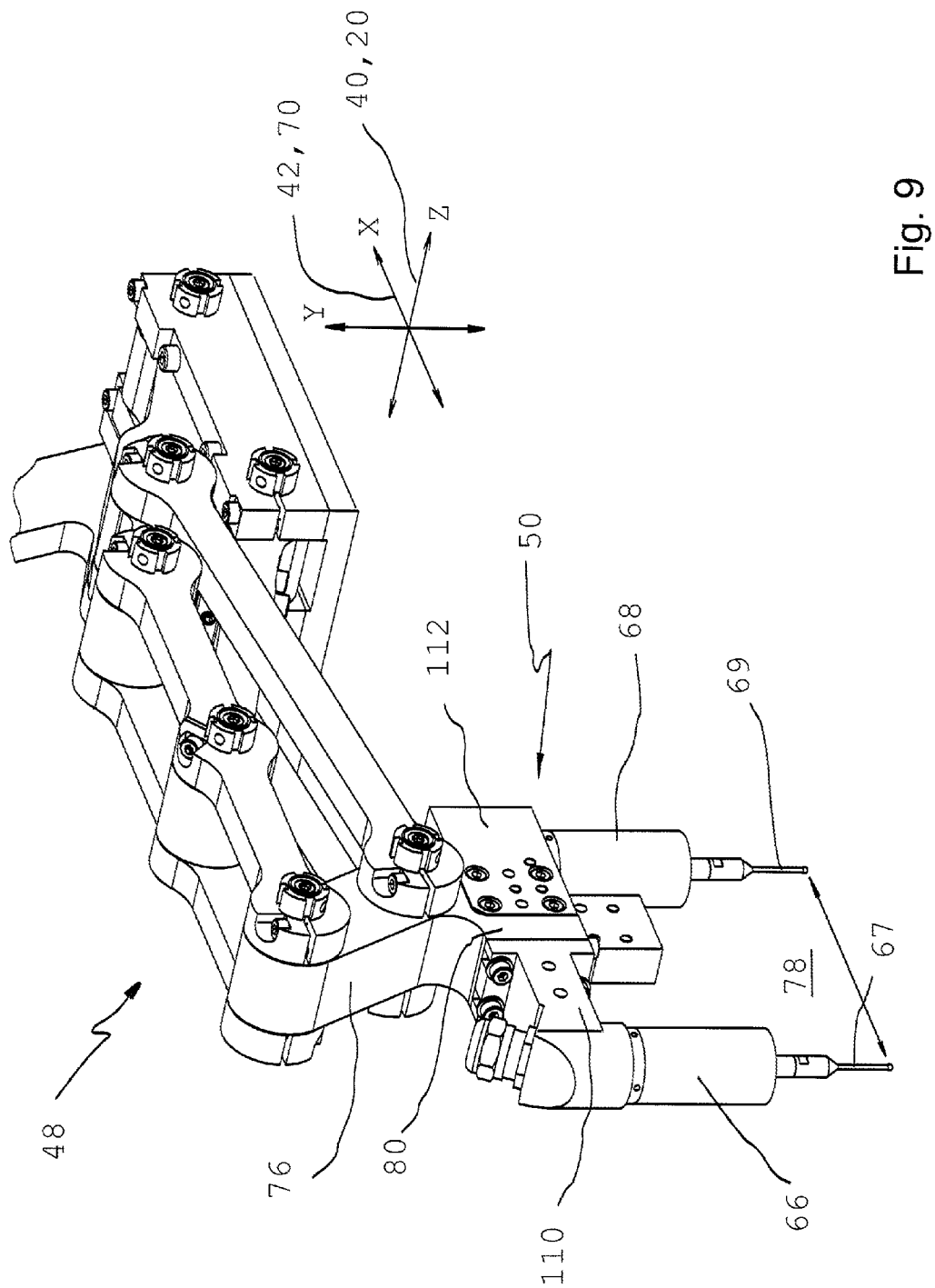
FIG. 9 is a perspective view of a further measuring device which may be combined with the machine tool according to FIG. 2, for instance, wherein the measuring device is in a first module configuration.
Figure 10:
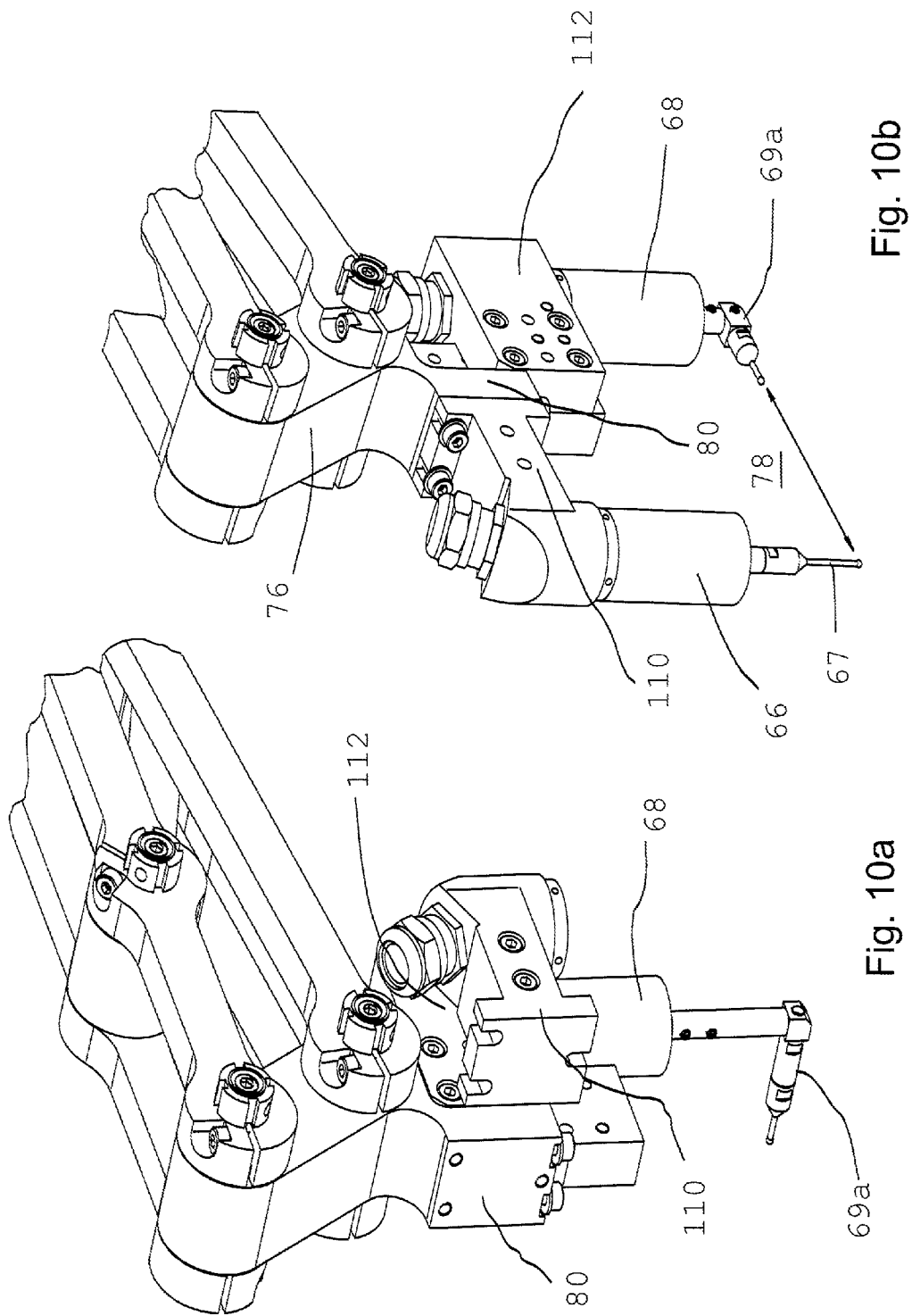
FIG. 10a, 10b show perspective partial views of the measuring device according to FIG. 9 in a second module configuration and a third module configuration.

FIG. 9 as well as FIGS. 10a and 10b illustrate perspective views of a modular measuring device 48 which may be for instance arranged at the tool unit 28 of the machine tool 10 according to FIG. 2. In the various views, the measuring device 48 assumes different module configurations. The measuring device 48 may be arranged in a pivotable fashion to move the measurement attachment 50 in a flexible and quick fashion between a measurement position and an out-of-engagement position, refer to FIG. 3a and FIG. 3b. The measuring device 48 may comprise a linkage mechanism which is drivable by an appropriate drive to enable the pivoting movement. A coordinate system X, Y, Z illustrated in FIG. 9 elucidates the corresponding axes of the machine tool, refer also to FIG. 2. The measurement attachment 50 comprises a support piece 80 at which the toggle measurement heads 66, 68 are arranged. The toggle measurement head 66 is arranged at the support piece 80 via an adapter piece 110. The toggle measurement head 68 is arranged at the support piece 80 via an adapter piece 112. The support piece 80 is arranged to receive the adapter pieces 110, 112 and thus the toggle measurement heads 66, 68 in a plurality of defined predetermined locations. In this way, a plurality of module configurations may be accomplished, through which, as a result, the measuring device 48 as such may be operated in highly-flexible fashion for a plurality of measurement tasks.

By way of example, FIG. 9 illustrates a first module configuration. The first toggle measurement head 66 and the second toggle measurement head 68 are arranged at the support piece 80 in a fashion basically parallel to one another and at the same height (with respect to the Y-axis). The measurement region 78 (along the X-axis) between the probe arms 67, 69 is so wide that also larger workpieces may be embraced by the toggle measurement heads 66, 68, for instance to detect a diameter.

FIG. 10a shows the measuring device 48 in a second module configuration. In contrast to its location assumed in FIG. 9, the adapter piece 110 is removed from its original position and mediately arranged at the support piece 80 at a side thereof via the adapter piece 112. The toggle measurement head 66 is for illustrative purposes not shown in FIG. 10a. The toggle measurement head 66 may be arranged in the module configuration shown in FIG. 10a so-to-say in a "parking position" axially displaced (with respect to the Z-axis, refer to FIG. 9) from the toggle measurement head 68. The toggle measurement head 66 and even the adapter piece 110 may be however entirely removed from the support piece 80. By way of example, a curved probe arm 69a is arranged at the toggle measurement head 68. The probe arm 69a is angled. The toggle measurement head 68 may axially touch the workpiece with the probe arm 69a in the measurement configuration shown in FIG. 10a. In this way, for instance axial surfaces or axial distances may be detected. Further, the probe arm 69a may be inserted in an axial depression or recess of a workpiece. In this way, for instance inner diameters or similar measurement values may be detected.

FIG. 10b elucidates a third module configuration of the measuring device 48 that is conceivable. Similar to the first module configuration that is shown in FIG. 9, the toggle measurement heads 66, 68 are arranged at the support piece 80 in fashion spaced from another along the X-axis (or: feed axis). A curved probe arm 69a is utilized at the toggle measurement head 68. An angled end of the probe arm 69a is oriented parallel to the X-axis. In this way, the toggle measurement heads 66, 68 and/or the probe arms 67, 69a in FIG. 10b embrace a measurement region 78 (along the X-axis) that is basically narrower than the measurement region of the module configuration shown in FIG. 9. The adapter piece 112 for the toggle measurement head 68 is arranged at the support piece 80 in predetermined location which differs from the predetermined location in the module configuration elucidated in FIG. 9 for height compensation (adjustment in Y-direction). It may be ensured in this way that also when utilizing the curved probe arms 69a, the relevant contact elements or contact balls of the probe arms 67, 69a are arranged at the same height, i.e. have the same measurement value along the Z-axis. By means of the module configuration shown in FIG. 10b, in a fashion basically similar to FIG. 9, diameters and similar distance values may be determined. This may involve that the to-be-measured workpieces basically comprise smaller diameters than those of FIG. 9. Further, with this measurement configuration, a workpiece may be also radially touched (along the feed axis or X-axis), wherein the probe arm 69a may be inserted in depressions or recesses at the workpiece. In this way, for instance longitudinal grooves, wedge grooves, toothings or the like may be measured.

It goes without saying that further module configurations may be envisaged. The measurement configurations shown in FIGS. 9, 10a and 10b merely represent exemplarily embodiments. Basically, a module configuration may be characterized by a defined predetermined location of one of the toggle measurement heads 66, 68. Further, a module configuration may be also defined by the arrangement of one of the probe arms 67, 69.

Figure 11:
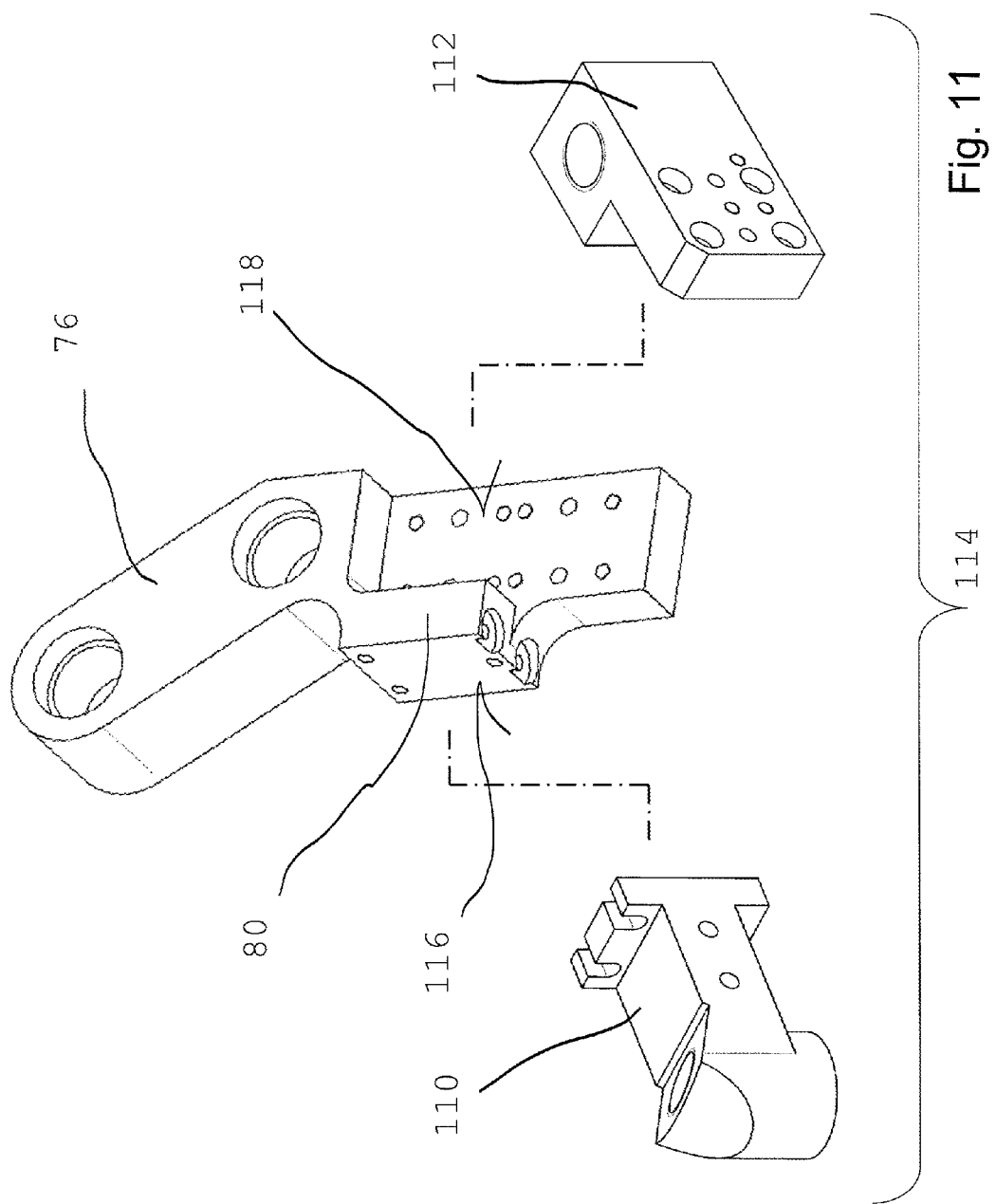
FIG. 11 is a perspective exploded view of a module assembly kit comprising a support piece, a first adapter piece and a second adapter piece.
Figure 12:
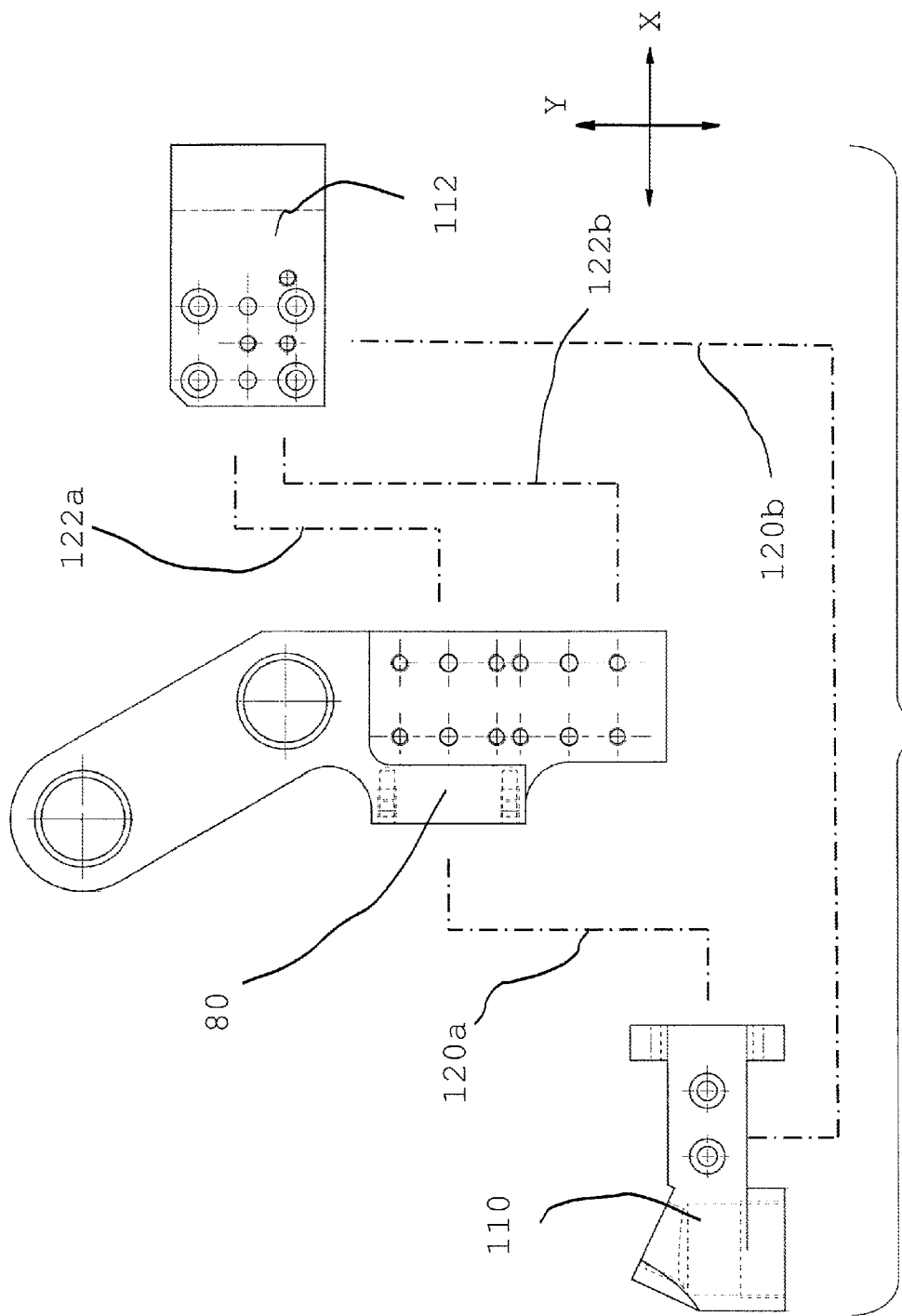
FIG. 12 is an exploded side view of the module assembly kit according to FIG. 11.

FIG. 11 and FIG. 12 elucidate an arrangement of a module assembly kit 114 in an exploded view. Basically, also the toggle measurement heads 66, 68 which are not shown in FIGS. 11 and 12 may be assigned to the module assembly kit 114. The module assembly kit 114 involves the support piece 80, the first adapter piece 110 and the second adapter piece 112. By means of the module assembly kit 114, for instance the module configurations shown in FIGS. 9, 10a and 10b may be effected. As indicated above, the support piece 80 and the extension arm 76 may be jointly arranged in an integrally formed fashion. Basically, also a separated arrangement may be envisaged. At the support piece 80, contact surfaces 116, 118 for the adapter pieces 110, 112 may be provided. At the adapter pieces 110, 112, corresponding mating surfaces may be provided (in FIGS. 11 and 12 hidden). Further, the support piece 80 as well as the adapter pieces 110, 112 may comprise appropriate mating contours, for instance thread holes and/or dowel holes.

In this way, a high-precision location fixation of the adapter pieces 110, 112 and thus of the toggle measurement heads 66, 68 may be effected. This may be ensured even in case the measuring device 48 is refitted, for instance when the respective module configuration is changed by modifying the module assembly kit 114. The contact surface 116 may be configured for receiving the adapter piece 110. The contact surface 118 may be configured for receiving the adapter piece 112. It may be basically envisaged to arrange the adapter pieces 110, 112 in a similar fashion. In accordance with such an embodiment, the contact surfaces 116, 118 may be correspondingly arranged in similar or likewise fashion. In this way, manufacturing efforts for the adapter pieces 110, 112 may be reduced. It is however also conceivable to deliberately arrange the adapter pieces 110, 112 in a different fashion and to adapt the contact surfaces 116, 118 accordingly. In accordance with a further embodiment, the adapter pieces 110, 112 may be arranged in such a way that at least one of the adapter pieces 110, 112 may be attached at the other one (refer to FIG. 10a).

FIG. 12 elucidates, on the basis of dot dashed lines, different configurations of the module assembly kit 114, which may be utilized to create different module configurations. The adapter piece 110 may be for instance arranged in a predetermined location at the contact surface 116 of the support piece 80, refer to a line designated by 120a. Besides, the adapter piece 110 may be attached in a further predetermined location at the adapter piece 112, refer to a line designated by 120b. In this way, the adapter piece 110 may be arranged at the support piece 80 in a mediate fashion. Hence, for instance a "parking position" for the adapter piece 110 may be provided. The adapter piece 112 may be received in different predetermined locations at the support piece 80, refer to lines designated by 122a, 122b. The predetermined locations 122a, 122b basically differ from one another in their location at the Y-axis. Hence, different lengths of the toggle measurement heads 66, 68 and their probe arms 67, 69, respectively, may be compensated. It goes without saying that the coordinate system X, Y shown in FIG. 12 for illustrative purposes is basically applicable when the measuring device 48 is in the measurement configuration, i.e. when the measuring device 48 is for instance pivoted towards a to-be-measured workpiece.

Figure 13:
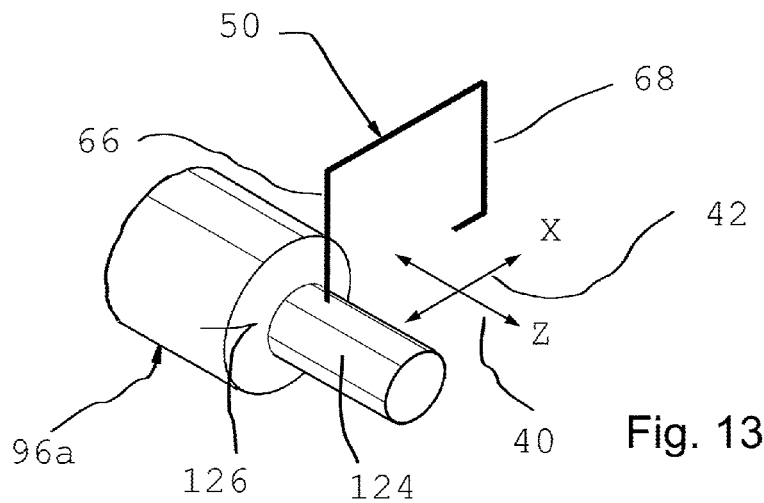
FIG. 13 is a greatly simplified schematic perspective view of a workpiece and a measurement attachment to elucidate a measurement task.

FIG. 13 illustrates a greatly simplified schematic perspective view of a workpiece 96a and a measurement attachment 50 to illustrate a measurement task. For illustrative purposes, the measurement attachment 50 including the toggle measurement heads 66, 68 is merely shown in a greatly symbolic fashion. The corresponding module configuration may for instance correspond to the illustration of FIG. 10b. For instance, the measurement task may involve touching an axial abutment surface 126 of the workpiece 96a. The abutment surface 126 may be arranged adjacent to a shaft shoulder 124. The axial touching event (in the Z-direction) of the abutment surface 126 may be for instance part of the determination of an axial distance. It may be further envisaged to touch a plurality of spots of the abutment surface 126 to determine a location tolerance or a shape tolerance. This may involve for instance the flatness of the abutment surface 126. In the shown configuration, further also a diameter of the shaft shoulder 124 may be determined.

Figures 14A, 14B:
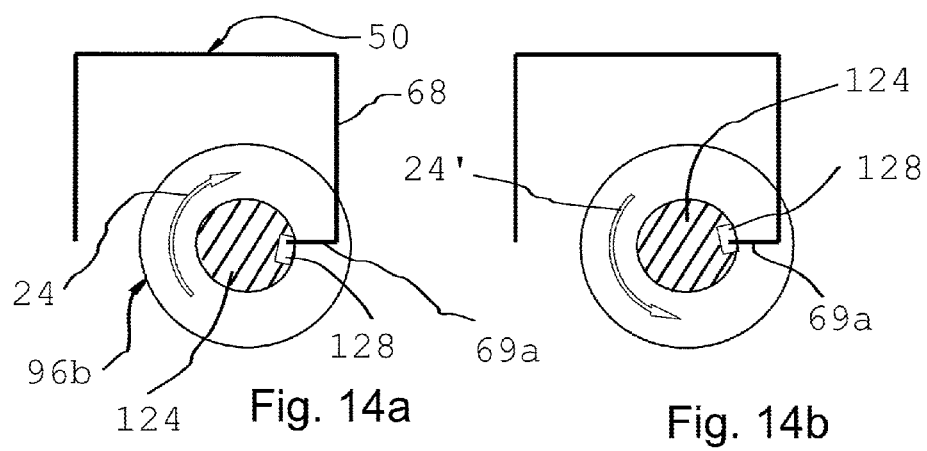
FIG. 14a, 14b show greatly simplified schematic frontal views of a further workpiece and a measurement attachment to elucidate a further measurement task.

FIG. 14a and FIG. 14b show greatly simplified schematic frontal views of a further workpiece 96b and a measurement attachment 50 to explain a further measurement task. The measurement attachment 50 may be basically present in a module configuration which corresponds to the measurement attachment 50 of FIG. 13. Further configurations may be envisaged. The measurement task elucidated in FIGS. 14a, 14b may be performed utilizing only a single toggle measurement head 66, 68. Therefore, basically also the measurement configuration shown in FIG. 11a is basically applicable when the probe arm 69a of the toggle measurement head 68 is appropriately curved and oriented. The workpiece 96b comprises a groove 128, particularly a longitudinal groove, which is processed at the shaft shoulder 124. The probe arm 69a may be radially inserted in the groove 128 to measure the groove. The probe arm 69a may be basically utilized to touch a ground surface of the groove 128. However, the probe arm 69a may be also utilized to touch side walls of the groove 128. In this way, the groove may be entirely or nearly entirely measured with little efforts. The touching event of the probe arm 69a of the measurement attachment 50 at the side walls of the groove 128 requires a defined rotation of the workpiece 96b, refer to an arrow in FIG. 14a designated by 24, and to an arrow in FIG. 14b designated by 24'. This may be achieved through a defined rotation of a workpiece spindle 16 about a workpiece spindle axis 20. As already indicated before, a functionality of such kind may also be referred to as C-axes functionality. By means of the cooperation of the control of the so-called C-axis and the drive of the tool unit 28, the groove 128 may be measured in a high-precision fashion.

Figure 15:
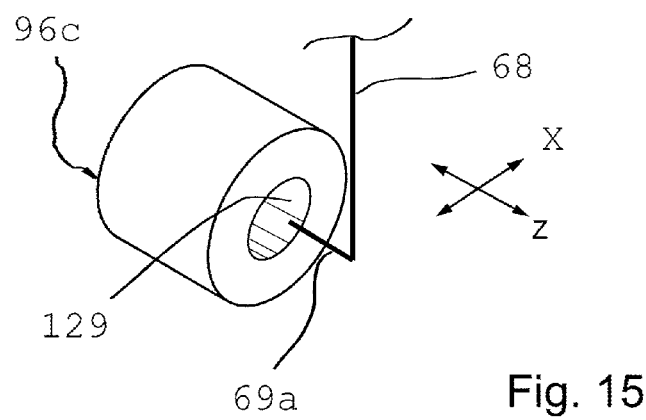
FIG. 15 is a greatly simplified schematic perspective view of yet another workpiece and a measurement attachment to elucidate an even further measurement task.

FIG. 15 illustrates a greatly simplified schematic perspective view of yet a further workpiece 96c and a measurement attachment (only partially illustrated in FIG. 15) to elucidate a further measurement task. The measurement attachment may be basically in a module configuration as illustrated in FIG. 10a. For this measurement task, a curved probe arm 69a of the toggle measurement head 68 may be axially inserted in the bore or recess 129 of the workpiece. Provided that the length of the curved portion of the probe arm 69a which is oriented in the Z-direction is sufficiently large, a depth of the bore or recess 129 may be determined, for instance. Further, a detection of the inner diameter of the bore or recess 129 may be performed with the probe arms 69a.

The modular arrangement of the measuring device 48 permits to perform different measurement tasks with a single module assembly kit 114. Required changeover work may be performed without huge efforts. Hence, it is enabled to detect outer diameters of workpieces 96 in a high precision fashion. According to a modified measurement task, a detection of a cylindricity or eccentricity may be accomplished. This may be effected by a coupling of the drives of the workpiece spindle axis 20 (C-axis) and the tool unit 28. A defined movement of the tool unit 28 parallel to the workpiece spindle axis 20 in the Z-direction permits a so-called longitudinal positioning of the at least one toggle measurement head 66, 68, hence, an axial touching of an abutment surface, for instance. Further, with a respectively curved probe arm, axial bores in the workpiece may be measured, for instance to detect their diameter. Radially moving the tool unit 28 (X-direction) permits a so-called circumferential positioning, e.g. a radial touching of the workpiece 96. By combining different functions, also complex measurement tasks may be performed, for instance measuring longitudinal grooves or circumferential grooves.

Figure 16:
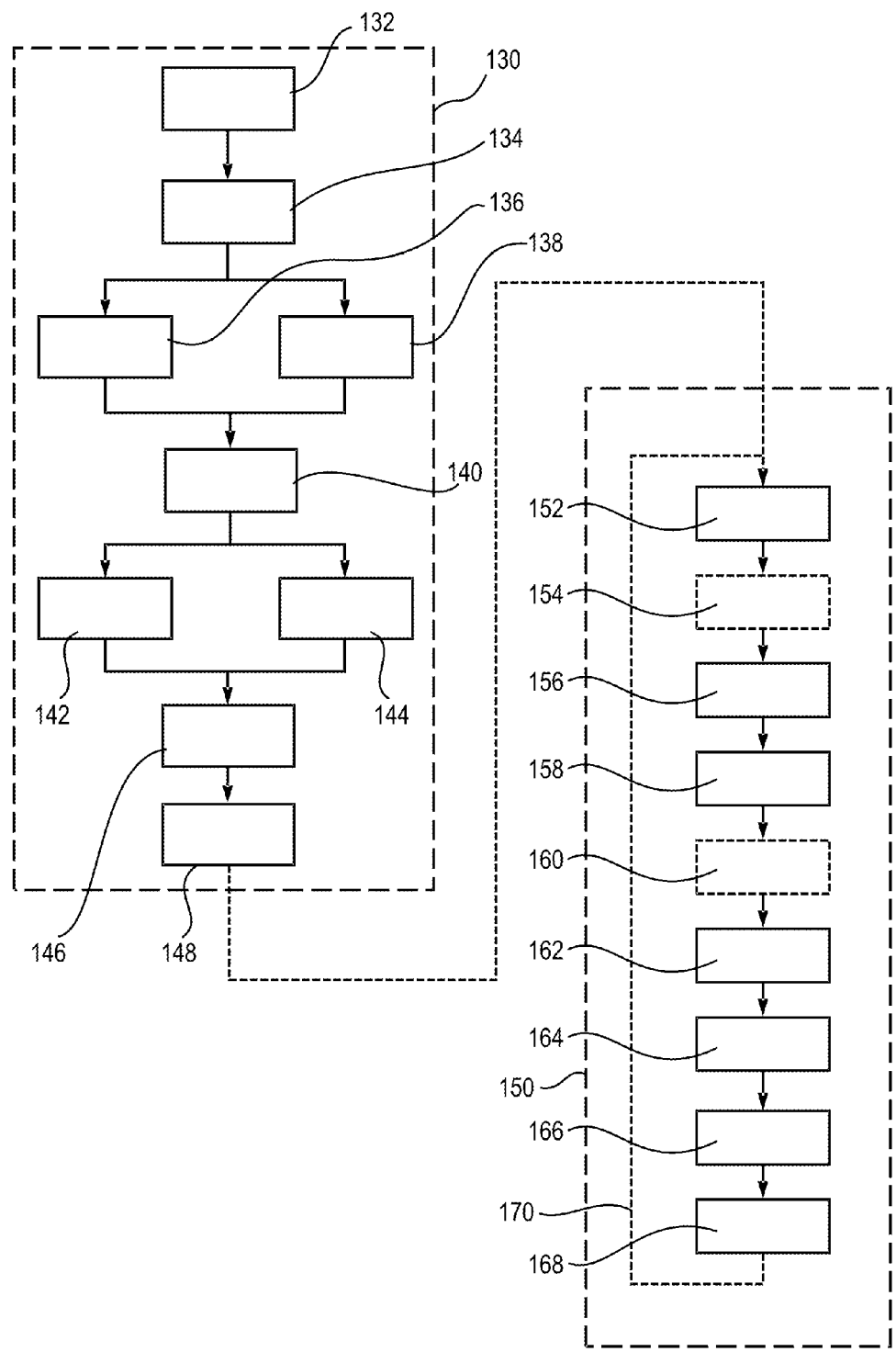
FIG. 16 shows schematic flow charts of a method for adjusting a measuring device and a method for measuring a workpiece.

FIG. 16 elucidates several steps of a method for measuring a workpiece which may be accomplished for instance with the machine tool 10.

The method comprises an initial block 130 which may for instance involve a gaging and/or calibrating action. In a first step 132, a reference dimension, for instance a reference body, is provided and inserted in a measurement region. The insertion may be for instance accomplished by pivoting a measuring device.

In a subsequent step 134, a first touching event of the reference dimension, for instance with a first toggle measurement head, is performed. The first touching event 134 may be for instance concluded by the steps 136, 138. The optional step 136 may involve an electrical gaging of a measurement circuit of the first toggle measurement head. The step 138 may involve a detection of an actual location along an X-axis and/or feed axis.

Subsequently, a step 140 may follow which comprises a second touching event by means of a second toggle measurement head. The step 140, second touching event, may involve the steps 142, 144 which may conclude the step 140. The optional step 142 may involve an electrical gaging of a measurement circuit of the second toggle measurement head. The step 144 may involve the detection of a second actual location along the feed axis and/or the X-axis.

In a subsequent step 146, based on the detected values and the known reference dimension, a basic distance may be determined, which may serve as a basis for further measurements. A step 148 concludes the gaging and/or calibrating action.

A block designated by 150 exemplarily illustrates the measurement of a workpiece using the beforehand determined basic distance. In a first step 152, a to-be-measured workpiece is received and for instance brought in the measurement region of the measuring device by pivoting the measuring device inserted.

In an optional step 154, a pre-position may be approached at a first feed velocity. In a further step 156, a first measurement position may be approached, at which a first touching event of the workpiece with the first toggle measurement head is accomplished. The approaching may be performed at a second feed velocity, for instance. In a further step 158, positional values associated with the first touching event may be detected.

In a subsequent optional step 160, a second pre-position may be approached with the first feed velocity. A subsequent step 162 involves approaching a second measurement position in which the second toggle measurement head may contact the workpiece 96. The approaching may be accomplished at a second feed velocity. In a further step 164, positional values associated with the second touching event may be detected.

A step 166 may follow the first and the second touching event, in which—based on the obtained data and the basic distance—an actual distance is determined. The measurement process may be concluded by a step 168 which may for instance involve a pivoting-out of the measuring device. An arrow 170 indicates that a plurality of measurements may be accomplished after a single gaging event. This may involve the determination of different actual distances, provided that they may be inserted in the measurement region.

The method steps described herein may form a part of a machine control program. Furthermore, the different embodiments may take the form of a computer program product accessible from a computer usable or computer readable medium providing program code for use by or in connection with a computer or any device or system that executes instructions. For the purposes of this disclosure, a computer usable or computer readable medium may generally be any tangible device or apparatus that may contain, store, communicate, propagate, or transport the program for use by or in connection with the instruction execution device.

In so far as embodiments of the disclosure have been described as being implemented, at least in part, by software-controlled data processing devices, it will be appreciated that the non-transitory machine-readable medium carrying such software, such as an optical disk, a magnetic disk, semiconductor memory or the like, is also considered to represent an embodiment of the present disclosure.

What is claimed is:

1. A machine tool comprising:
   a workpiece mount comprising at least one workpiece holder for receiving a workpiece,
   a tool unit comprising a tool spindle for receiving and for driving a tool,
   a modular measuring device which is received at the tool unit, and which comprises a support piece and at least one toggle measurement head,
   a control device which connects the measuring device and the tool unit,
   wherein the tool unit is movable along at least one feed axis with respect to the workpiece,
   wherein the at least one toggle measurement head is arranged at the support piece,
   wherein the support piece provides a plurality of defined predetermined locations for the at least one toggle measurement head, and
   wherein the control device is further configured to;
   detect signals that are triggered by the at least one toggle measurement head when touching the workpiece, and
   determine, on the basis of an actual location of the tool unit, an actual position of the at least one toggle measurement head.

2. The machine tool as claimed in claim 1, wherein the machine tool is arranged as a grinding machine that comprises a grinding head and a tool spindle, wherein the tool spindle is arranged at the grinding head, and wherein the tool spindle receives and drives at least one grinding wheel.

3. The machine tool as claimed in claim 1, wherein the modular measuring device comprises at least two toggle measurement heads, spaced from one another, that are received at the support piece, wherein the at least two toggle measurement heads comprise, in a first measurement configuration, a distance to one another that defines a measurement region, wherein the distance is selected to be larger than a known reference dimension, and wherein the control device is configured to detect an actual location of the tool unit along the feed axis, and to determine, based on a displacement path of the tool unit, when touching the workpiece that is arranged in the measurement region by means of the at least two toggle measurement heads under consideration of at least one of the reference dimension and the distance, an actual distance.

4. The machine tool as claimed in claim 3, wherein the at least two toggle measurement heads are, in a second measurement configuration, received at the support piece spaced apart from one another in a spatial direction such that each respective operative toggle measurement head is enabled to axially touch the workpiece.

5. The machine tool as claimed in claim 3, wherein the measuring device comprises a measurement attachment that receives the at least two toggle measurement heads, and wherein the measurement attachment is pivotable to bring the workpiece in the measurement region.

6. The machine tool as claimed in claim 3, wherein the control device is configured to drive and move the tool unit and the tool in a downstream machining operation, based on the detected actual distance of the workpiece.

7. The machine tool as claimed in claim 3, wherein the actual distance is an actual diameter of the workpiece.

8. The machine tool as claimed in claim 1, wherein at least one toggle measurement head is received at an adapter piece that is adapted to the support piece and that is arranged to be mounted to the support piece in a plurality of defined predetermined locations.

9. The machine tool as claimed in claim 1, wherein the at least one toggle measurement head comprises a curved probe arm that runs out at an angle with respect to the toggle measurement head.

10. The machine tool as claimed in claim 1, wherein the measuring device comprises a linkage mechanism that permits a pivoting movement between a measurement position and an out-of-engagement position.

11. The machine tool as claimed in claim 1, wherein the workpiece is attachable to a workpiece spindle that is selectively drivable in a rotating fashion about a workpiece spindle axis.

12. The machine tool as claimed in claim 11, wherein the workpiece spindle axis is arranged perpendicular to the feed axis, and wherein the tool spindle comprises a tool spindle axis that is arranged parallel to the workpiece spindle axis.

13. The machine tool as claimed in claim 11, wherein the tool unit is movable with respect to the workpiece parallel to the workpiece spindle axis.

14. The machine tool as claimed in claim 13, wherein the control device is further configured to move, in a coupled movement, the tool unit parallel to the workpiece spindle axis.

15. The machine tool as claimed in claim 11, wherein the control device is configured, in a coupled movement, to move the tool unit along the feed axis, and to drive the workpiece spindle about the workpiece spindle axis.

16. A method for measuring a workpiece in a machine tool, comprising the following steps:
providing a modular measuring device which is movable with respect to a workpiece, which is received at a workpiece holder, along at least one feed axis,
wherein the measuring device is received at a tool unit comprising a tool spindle, and
wherein the measuring device comprises at least one toggle measurement head that is received at a support piece that provides a plurality of defined predetermined locations for the at least one toggle measurement head,
moving the tool unit with respect to the workpiece,
detecting signals that are triggered by the at least one toggle measurement head when touching the workpiece, and determining an actual position of the at least one toggle measurement head on the basis of an actual location of the tool unit.

17. The method as claimed in claim 16, further comprising the following step:
providing a modular measuring device comprising at least two toggle measurement heads which are received at a support piece spaced apart from one another,
wherein the support piece provides a plurality of defined predetermined locations for the at least two toggle measurement heads.

18. The method as claimed in claim 16, further comprising the following steps:
preparing a measurement, comprising:
setting a basic distance between the at least two toggle measurement heads which is greater than a known reference dimension of a reference geometry and which defines a measurement region,
receiving the reference geometry at the machine tool,
bringing the reference dimension in the measurement region,
displacing the measuring device with respect to the reference geometry, and touching the reference dimension by means of the toggle measurement heads,
thereby detecting the actual locations of the measuring device, and thus detecting the displacement path of the measuring device, and
determining the basic distance at least based on the reference dimension and the actual locations of the measuring device when touching the reference geometry.

19. The method as claimed in claim 18, further comprising the following steps:
conducting at least one measurement, comprising:
receiving the workpiece at the machine tool, bringing a measurement geometry of the workpiece in the measurement region,
touching the measurement geometry of the workpiece by means of the toggle measurement heads,
thereby detecting the displacement path of the measuring device, and
determining an actual distance of the measurement geometry at least based on the basic distance and the displacement path of the measuring device when touching the workpiece.

20. A non-transitory computer readable medium that stores therein a machine tool control program, wherein the machine tool control program includes processing steps for implementing the method as claimed in claim 16.

* * * * *